(12) United States Patent
Zhang et al.

(10) Patent No.: US 9,886,522 B2
(45) Date of Patent: Feb. 6, 2018

(54) TECHNIQUES FOR INFERRING AN ORGANIZATIONAL HIERARCHY FROM A SOCIAL GRAPH

(71) Applicant: Microsoft Technology Licensing, LLC, Redmond, WA (US)

(72) Inventors: Ximeng Zhang, San Jose, CA (US); Guan Wang, Chicago, IL (US); Yuchen Zhao, Chicago, IL (US); Shaobo Liu, Belmont, CA (US); Christian Sutherland-Wong, San Francisco, CA (US); Mike Derezin, Alamo, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 28 days.

(21) Appl. No.: 14/716,502

(22) Filed: May 19, 2015

(65) Prior Publication Data
US 2015/0254371 A1 Sep. 10, 2015

Related U.S. Application Data

(63) Continuation of application No. 13/756,142, filed on Jan. 31, 2013, now Pat. No. 9,049,249.

(Continued)

(51) Int. Cl.
*G06F 17/30* (2006.01)
*H04L 29/08* (2006.01)

(Continued)

(52) U.S. Cl.
CPC .. *G06F 17/30958* (2013.01); *G06F 17/30675* (2013.01); *G06N 7/005* (2013.01);
(Continued)

(58) Field of Classification Search
CPC ...... G06Q 50/01; G06Q 10/063; G06N 7/005; G06N 99/005; G06F 17/30675; G06F 17/30958; H04L 67/306
See application file for complete search history.

(56) References Cited

U.S. PATENT DOCUMENTS 7,685,016 B2 3/2010 Flores et al.
7,689,537 B2 3/2010 Goodwin et al.
(Continued)

OTHER PUBLICATIONS

"U.S. Appl. No. 13/756,142, Amendment Under 37 C.F.R. filed Apr. 24, 2015", 13 pgs.
(Continued)

*Primary Examiner* — Chirag R Patel
(74) *Attorney, Agent, or Firm* — Schwegman Lundberg & Woessner, P.A.

(57) ABSTRACT

A method, system and article of manufacture for determining a global hierarchy of an entity by computing subjective coherence strength between nodes of first members of a social network service, computing objective entanglement strength between nodes of second members of the social network service, using subjective coherence strength and objective entanglement strength, compute the pairwise latent relationship probabilities between different ones of the nodes of the social network service, and using the pairwise relationship probabilities, compute the global hierarchy relationship.

20 Claims, 18 Drawing Sheets

Related U.S. Application Data

(60) Provisional application No. 61/729,997, filed on Nov. 26, 2012.

(51) Int. Cl.
  *G06Q 50/00* (2012.01)
  *G06Q 10/06* (2012.01)
  *G06N 7/00* (2006.01)

(52) U.S. Cl.
  CPC ........... *G06Q 10/063* (2013.01); *G06Q 50/00* (2013.01); *G06Q 50/01* (2013.01); *H04L 67/306* (2013.01)

(56) References Cited

U.S. PATENT DOCUMENTS

| | | |
|---|---|---|
| 8,533,110 B2 | 9/2013 | Kremen et al. |
| 9,049,249 B2 | 6/2015 | Zhang et al. |
| 2012/0036209 A1 | 2/2012 | Lewis et al. |
| 2012/0311030 A1* | 12/2012 | Lin .................. G06F 15/16 709/204 |
| 2014/0032659 A1* | 1/2014 | Marini .................. H04L 51/32 709/204 |
| 2014/0195449 A1 | 7/2014 | Komissarchik et al. |
| 2014/0214945 A1 | 7/2014 | Zhang et al. |
| 2014/0337419 A9 | 11/2014 | Zhang et al. |

OTHER PUBLICATIONS

"U.S. Appl. No. 13/756,142, Notice of Allowance dated Jan. 28, 2015", 12 pgs.

"U.S. Appl. No. 13/756,142, PTO Response to Rule 312 Communication dated May 4, 2015", 2 pgs.

\* cited by examiner

38

- Direct Connection
- Following
- In Address Book (Contact List)
- In Other (e.g., External) Network
- Attended Common Event
- Network Interaction
    - (e.g., message, share, poll, like, comment, etc.)
- Offsite Interaction
    - (e.g., e-mail, direct tweet, re-tweet, etc.)
- Common Entity
    - (e.g., company, school, group, organization, etc.)
- Historical
    - (e.g., searched for..., viewed profile, viewed content)
- Common Profile Attributes or Characteristics
    - (skill, industry, location, specialties, associations, certifications, professional designations, awards, degree/major/minor)
- Connection at Company
- Alumni at Company
- Recently Joined/Left Company
- Current/Past Employer
- Applied for Positions with Company
- Interacted with Employee at Company
- Viewing history
- In Group
- Group in Network
- Groups being Managed
- Interacted with Group Content

FIG. 3

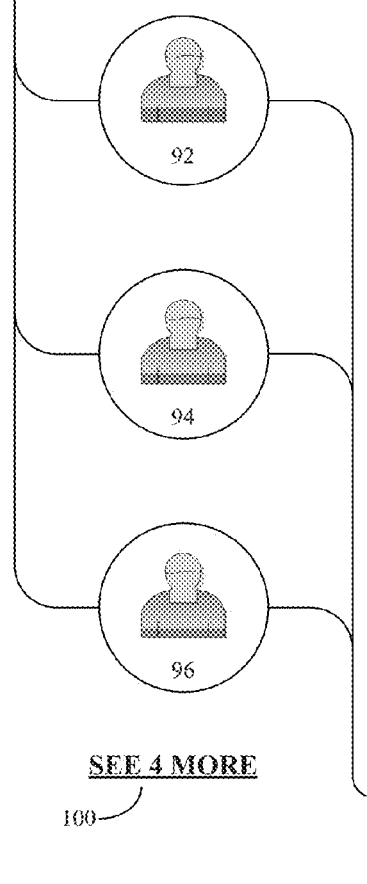

- YOU have seven shared connections.

JANE DOE (1st)
Silicon Valley Innovation, Social Networking...
You currently work at ACME Products with JANE

JOHN SMITH (1st)
Founder, CTO at Cloud Computing Inc.
You worked with John at Cloud Computing 2002 -2005

SARAH GUNDERSON (1st)
Engineering Director at Express Tech.
You worked with Sarah at Cloud Computing 2004 -2005

PETER QUICK
CEO Game Machine, Inc.

SEE 4 MORE

TECHNIQUES FOR INFERRING AN ORGANIZATIONAL HIERARCHY FROM A SOCIAL GRAPH

RELATED APPLICATIONS

This application is a continuation of U.S. patent application Ser. No. 13/756,142, filed on Jan. 31, 2013, which claims the benefit of priority of U.S. Provisional Application No. 61/729,997, filed Nov. 26, 2012, which applications are incorporated herein by reference in their entirety.

TECHNICAL FIELD

The present disclosure generally relates to data processing systems. More specifically, the present disclosure relates to methods, systems and computer program products that estimate the hierarchy of an organization from entries and relationships in social graphs of a social network service.

BACKGROUND

Social network platforms have information on aspects of their members' social lives. People's relationships is one primary kind of such information. Therefore, relationship mining on social networks is becoming a promising research direction, but previously it has dealt only with explicit relations, i.e., one has background knowledge to follow in addition to the data while uncovering the target relationship. For example, people can discover advisor-advisee relation in an academic collaboration network using the background knowledge of the properties of publication and collaboration records. However, in many practical cases, there are no such explicit clues. The relations are latent when there is little or no background knowledge. For example, on a professional social network service, managers may have connections with their employees. Although this manager-employee relation exists on the network, inferring it is an extremely challenging task. Due to its latent nature, usually none of the features like connections, job titles, working experiences, and the like, explicitly indicates working relations directly. Furthermore, the relation can be hierarchical. However, from pairwise manager-employee relations on a professional social network, the organization structure of a company may be able to be inferred. For example, the latent social relationship may be inferred and used to a construct a hierarchy from heterogeneous data sources. Since the relation is latent, there is appears to be no single source or straightforward combination of sources of data that contain explicit clues of it. Concepts in the physics domain such as the effect of gravitational force on escape velocity may be used to design a force-based schema to integrate the information from heterogeneous sources on social networks harmonically to predict the pairwise latent relations. The hierarchy construction may be modelled with a Reduced Markov Decision Process, which utilizes pair-wise relations. This may be achieved by relationship mining on an online social network service.

Generally speaking, online social network services provide users with a mechanism for defining, and memorializing in a digital format, their relationships with other people. This digital representation of real-world relationships is frequently referred to as a social graph. Many social network services utilize a social graph to facilitate electronic communications and the sharing of information between its users or members. For instance, the relationship between two members of a social network service, as defined in the social graph of the social network service, may determine the access and sharing privileges that exist between the two members. As such, the social graph in use by a social network service may determine the manner in which two members of the social network service can interact with one another via the various communication and sharing mechanisms supported by the social network service.

Some social network services aim to enable friends and family to communicate and share with one another, while others are specifically directed to business users with a goal of facilitating the establishment of professional networks and the sharing of business information. For purposes of the present disclosure, the terms "social network" and "social network service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

With many social network services, members are prompted to provide a variety of personal information, which may be displayed in a member's personal web page. Such information is commonly referred to as "personal profile information", or simply "profile information", and when shown collectively, it is commonly referred to as a member's profile. For example, with some of the many social network services in use today, the personal information that is commonly requested and displayed as part of a member's profile includes a member's age (e.g., birth date), gender, contact information, home town, address, the name of the member's spouse and/or family members, a photograph of the member, interests, and so forth. With certain social network services, such as some business network services, a member's personal information may include information commonly included in a professional resume or curriculum vitae, such as information about a person's education, employment history, job skills, professional organizations, and so forth. With some social network services, a member's profile may be viewable to the public by default, or alternatively, the member may specify that only some portion of the profile is to be public by default. As such, many social network services serve as a sort of directory of people to be searched and browsed.

Because social network services are a rich source of information about people, social network services are an extremely useful tool when performing certain tasks. For example, many people use social network services to search for, and/or browse, member profiles that exhibit various desired characteristics. For instance, a person may search for persons who have profiles indicating the possession of certain technical skills, and educational and professional experiences and backgrounds. Similarly, when someone needs to hire a person employed in a particular profession (e.g., a general contractor, a doctor, a lawyer, a landscaper, a plumber, an investment banker, and so forth), that person may turn to a social network service to identify persons who possess the requisite skills and qualifications. In another scenario, a person may desire to contact someone for the purpose of exploring or proposing the possibility of a particular business arrangement or relationship. Accordingly, the person may use a social network service to identify the appropriate persons to contact. Additionally, as discussed subsequently, pairwise manager-employee relations may be determined on a social network, and from this the organization structure of a company may be able to be inferred.

DESCRIPTION OF THE DRAWINGS

Some embodiments are illustrated by way of example and not limitation in the FIGS. of the accompanying drawings, in which:

FIG. 3 is a table showing examples of the many different types of associations that may be represented with an edge connecting two nodes in a graph data structure, consistent with some embodiments of the invention;

FIGS. 6 through 8 are examples of some user interface elements that convey a visual representation of connection paths in a social graph connecting a user with a target member, consistent with embodiments of the invention;

FIG. 11 is a diagram illustrating an example of generating a score of "objective entangled strength" to measure how a pair of members entangles from objective perspective.

DETAILED DESCRIPTION

Figure 1:
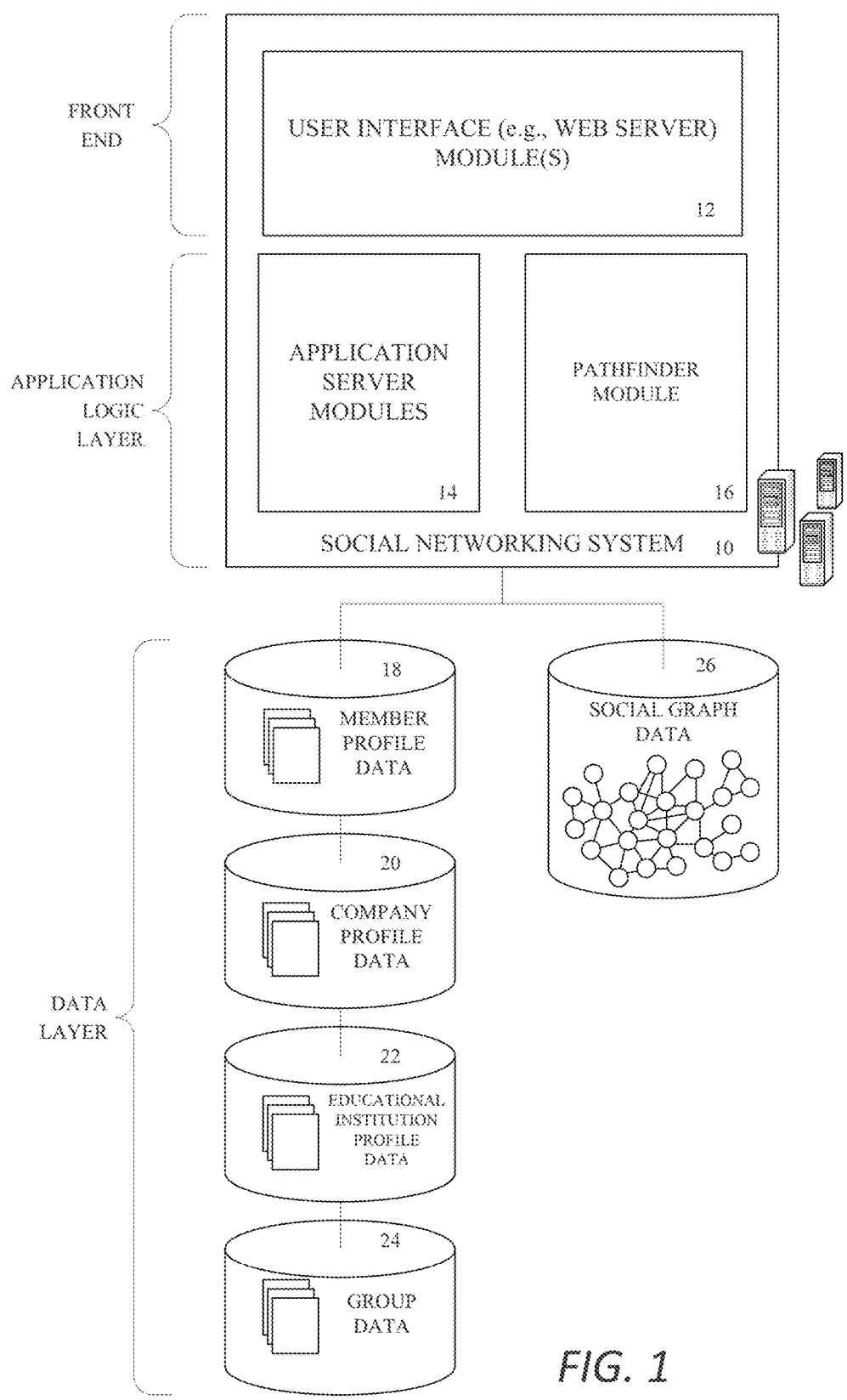
FIG. 1 is a block diagram illustrating various functional components of a social network system with a pathfinder module, consistent with some embodiments of the invention, for use with a wide variety of applications, and specifically for identifying and then presenting connection paths in a social graph connecting a user with a target member of the social network service.

The present disclosure describes methods, systems and computer program products for inferring the hierarchy, or the estimation of the hierarchy, of an organization by leveraging a social graph of a social network service to identify and convey information about various connection paths and relationships between and among members, as defined in or inferred from the social graph of the social network service. In the following description, for purposes of explanation, numerous specific details are set forth in order to provide a thorough understanding of the various aspects of different embodiments of the present invention. It will be evident, however, to one skilled in the art, that the present invention may be practiced without all of the specific details and/or with variations permutations and combinations of the various features and elements described herein.

Consistent with embodiments of the invention, some of the many tasks people commonly use a social network service to perform are improved by conveying to a user of the service specific information concerning the associations (e.g., relationships and affiliations) that a user, or an entity on whose behalf the user is acting (e.g., a company, group or other organization with which the user is associated), might share in common with another member of the social network service, while the user is performing a particular task. Specifically, the inventive concepts described herein involve techniques for analyzing a social graph to identify connection paths connecting a user (or, some other entity) with another member of the social network service, and then to present a visual representation of those connection paths that are determined to be the strongest, or best suited for a particular purpose. While social graphs used by many conventional social network services model only the relationships that exist between people, embodiments of the present invention use a social graph that includes not only people, but other types of entities as well. For example, a social graph consistent with some embodiments of the invention may include entity types such as, companies, educational institutions, groups, and so forth. As such, a connection path in the social graph that connects two members may be based on a wide variety of associations between the various entities, including personal relationships between members, a common employment relationship with a particular company, common membership in a group, and so forth.

The algorithmic processes used to identify and present the connection paths connecting a user with a target member are implemented with a combination of hardware (e.g., computer processors and memory) and software (e.g., executable instructions) that may be generally referred to herein as a pathfinder module. Furthermore, the inventive concepts that are presented herein are generally applicable to a wide variety and nature of applications and tasks. However, for brevity, the examples of the inventive concepts described herein are primarily presented in the context of two specific types of applications including applications involving electronic or digital messaging or communication systems and techniques, and applications for facilitating browsing and searching of member profiles.

Consistent with some embodiments of the invention, a social network service maintains a social graph, implemented as a graph data structure having nodes and edges, where the nodes represent different entities and the edges represent various associations or relationships between entities. For example, with some embodiments, the entity types may include people, companies, educational institutions (e.g., schools and universities), and groups (e.g., online groups, or professional organizations), among others. Accordingly, the edges that connect any two nodes (entities) represent types of associations between the entities, and will therefore depend in part on the entities involved. For example, an edge connecting two nodes that represent people may be representative of a specific type of relationship between the two people, including a direct, bilateral connection between the two people. An edge connecting a first node, representing a person, with a second node, representing a company, may be representative of an employment relationship (current or previous) between the person and the company. In addition to the edges having a particular type, representative of the nature of the relationship between two entities, each edge connecting two entities is assigned an edge score to reflect the strength, or relevance, of the particular association.

Consistent with some embodiments, when a user is performing a particular task, the social network service (e.g., specifically, the pathfinder module) will perform an algorithmic process to analyze the social graph and to identify the connection paths that connect a user (e.g., the person performing the task) or some entity specified by the user and on whose behalf the user may be acting, with another member of the social network service. The connection path or paths that are determined to be strongest, or most relevant, with respect to the particular task being performed, are then visually presented to the user, providing the user with important contextual information for completing the task. For purposes of the present disclosure, to distinguish the person involved in the performance of a task with those persons who may be subjects of a task, the term "user" is used herein to identify the person who is performing a task, while the terms "target" and/or "target member" are used to identify a subject of the task. Similarly, in the specific context of a digital messaging application, the terms "message sender" and "message recipient" are used herein. While a message recipient is the member to whom a message is addressed, a message sender is the user performing the task of preparing and sending a message on his or her own behalf, or on behalf of an entity, such as a company, group or other organization.

Consistent with some embodiments of the invention, for each connection path connecting a user to a target member, a path score is derived to reflect the overall connection strength (or relevance) of the path connecting the user with the target. For example, with some embodiments, the path score may be derived by simply aggregating (e.g., summing, or otherwise combining with an algorithm or formula) the individual edge scores that correspond with the edges connecting the nodes that ultimately connect the user with the target member. As described in greater detail below, a variety of algorithms may be used to derive the individual edge scores for a particular edge and/or edge type connecting any two nodes in the social graph. Similarly, a variety of algorithms may be used to derive the path scores for the connection paths connecting a user with a target. For example, with some embodiments, various weighting factors may be applied to influence (e.g., increase or decrease) the edge score for a particular edge type (e.g., the type of association existing between two nodes in the social graph), based on the particular task for which the connection paths are being identified and presented. In any case, once the various connection paths connecting a user or some user-specified entity to a target member have been identified and ordered or ranked by path score, a visual representation of the connection path having the highest path score may be presented to the user. With some embodiments, a visual representation of several independent connection paths may be presented.

In the context of a messaging application, and particularly a web-based messaging application, consistent with some embodiments of the invention, when a message sender has addressed a message to another member of the social network service (e.g., a message recipient), the message sender is presented with a visual representation of the best connection path or paths connecting the message sender to the message recipient, as determined by analysis of the social graph maintained by the social network service. With some embodiments, the algorithm used to derive path scores for the various connection paths connecting the message sender to the message recipient may be selected based on an inferred type of communication, or an explicitly selected type of communication. For instance, with some embodiments, the social network service may use machine learning techniques and/or various algorithms to infer the type of communication (e.g., the purpose or reason the message sender is communicating with the message recipient), and then based on this information, a particular algorithm for deriving the path scores may be selected. With some embodiments, the message sender may explicitly select or otherwise specify the type of communication, such that the selected communication type will influence the algorithm used to derive the path scores for the connection paths connecting the message sender with the message recipient. By tailoring the algorithm that may be used to derive the path scores to a specific task (e.g., sending a message) and/or a specific context for a task (e.g., a type of communication for the task of sending a message), the most relevant connection path(s) can be presented to the user, based on the task and context in which the task is being performed.

With some embodiments, the visual representation of the best connection path or paths (e.g., the connection path or paths with the highest path scores) may be automatically embedded or otherwise included in the content of a message being prepared by the message sender. Consequently, when the message recipient receives the message, the message recipient can view a visual representation of the best connection path or paths connecting the message sender with the message recipient. Alternatively, the connection path or paths may be presented in a manner that allows the message sender to simply reference the relevant information when the message sender is composing the message. For instance, with some embodiments, the visual representation of the connection path may be presented as a separate element of a graphical user interface displayed when the message sender is composing the message. Similarly, the visual representation of the connection path or paths may be presented to a message recipient, not as part of a received electronic message, but instead as part of a separate user interface element that is presented when the message recipient is accessing and viewing the electronic message. In either case, by identifying and then presenting information indicating how the message sender and message recipient are associated or related (e.g., connected via the social graph), the message recipient is more likely to be receptive to receiving, reading, and replying to the message. This is particularly advantageous in an environment where people are frequently overloaded with information and are receiving hundreds of messages per day.

With some embodiments, and specifically in the context of an application that enables users to search for or otherwise browse member profiles, the strongest or most relevant connection path or paths connecting the user with a target member will be presented when the user is viewing the profile of the target member. For example, a user may perform a search of member profiles by specifying various desirable member attributes or characteristics. For instance, a person may perform a search by specifying one or more member profile characteristics, including: a company at which one is employed, a job title, a college or university attended, and one or more possessed skills. In response to the person's query, the social network service may present to the person a list of members having member profile attributes or characteristics that match (partially or fully) the characteristics specified in the query. When the person selects a particular member from the list, the person will be presented with the selected member's profile information. In addition, the social network service may present a visual representation of a connection path connecting the person to the selected member, where the connection path has been selected for having the highest path score of all connection paths connecting the person with the target member. Alternatively, a visual representation of several individual connection paths may be presented. With some embodiments, the connection path or paths may be presented automatically with the profile information of the selected member. Alternatively, with some embodiments, a graphical user interface element (e.g., a button or link) may be provided with the selected member profile, such that when the person selects or otherwise interacts with the graphical user interface element, the social network service will invoke the algorithmic process for identifying and presenting the connection path having the highest path score.

With some embodiments, the user that is performing a search of member profiles, or otherwise browsing member profiles, may specify as a sort of proxy an alternative entity (e.g., person, company or other organization) to serve as the starting or beginning node for purposes of identifying the connection paths to an identified target member. For instance, if an independent party has been tasked with inferring the organization chart for a particular part of a particular company, party may specify that the company be used as the starting node in the social graph of any connection paths to a particular target member. As such, a pathfinder module of the social network service will attempt to identify and present connection paths connecting the specified company with the identified target member. In such a scenario, the nodes forming the connection paths between the company and the target member may include entities of various types, including but not limited to members who are current or past employees of the specified company, other companies that are associated with the specified company, and schools whose graduates are employed by the specified company.

Referring again to a messaging application, consistent with some embodiments a message sender may compose a message intended for multiple message recipients. For instance, a person may use the social network service to compile a list of target members to contact as potential candidates for a job opening. The person may then compose a single generic message to be sent to all the target members on the list, without manually personalizing or customizing the content of the message for each individual member specified as a message recipient. In general, the connection paths from the message sender (the person or the company on whose behalf the person is acting) to each message recipient will be different. In this scenario, the pathfinder module of the social network service is automatically invoked once for each individual message recipient. With each invocation, the pathfinder module will attempt to identify connection paths connecting the message sender with an individual message recipient. Upon successfully identifying one or more connection paths, the message content to be communicated to a particular message recipient will automatically be modified to include a description or graphical visualization of one or more of the strongest, or most relevant, connection paths. In this way, the messaging application can perform a mass customization operation to customize or personalize an otherwise general or generic message so that that a customized or personalized instance of the message is communicated to each message recipient. In particular, the customized or personalized message may include a visual representation of a connection path between the message recipient and the message sender, or the message recipient and some entity on behalf of which the message is being communicated. Alternatively, the message may include information identifying one or more entities in the connection path with an indication of how the message sender or the entity on whose behalf the message is being sent and the message recipient are associated. The personalization of the message to provide some social context will increase the relevance of the message to the particular message recipient.

With some embodiments, in addition to presenting the user with a visual representation of the connection path with the highest path score, the actual path score may be presented to the user. The path score may be normalized in some manner for easy comparison with other path scores, thereby giving the user a sense of which connection paths may be best for a particular task. The path score may be conveyed on some arbitrary scale (e.g., a scale of one to five, with one being a low score, and five being a high score), or simply as a raw number. Additionally, the visual representation of the connection path connecting the user with the target member may be presented in an interactive manner, such that additional information about various entities and associations (e.g., relationships and/or affiliations) may be easily obtained by the user, for example, by manipulating a cursor control device or interacting with a touch sensitive display to select or hover over various user interface elements included in the visual representation of the connection path.

With some embodiments, various user interface controls may be presented with the visual representation of the connection path, thereby allowing the user to very quickly navigate or cycle through the many connection paths connecting the user with the target member, or filter and/or sort the connection paths based on various connection path parameters. For example, by selecting a particular button or link associated with a navigation control, the view of the visual representation of the connection path with the highest path score may be replaced with a view of a visual representation of the connection path with the second highest path score. With some embodiments, user interface controls may be presented to enable the user to filter and/or sort connection paths based on certain entities, entity types, edge types and/or any combinations thereof. For instance, a filtering mechanism may allow the user to select for presentation only those connection paths that include a particular type of entity (e.g., a person, a company, a school or university, or a group), or even a particular entity (e.g., all connection paths including a specific entity, such as the person, John Smith, or a specific educational institution, such as Stanford University). Similarly, the filtering mechanism may enable the user to identify a particular entity to be excluded from all connection paths, such that only those connection paths that do not include the selected entity will be presented to the user. With some embodiments, the filtering mechanism may enable the user to specify various requirements concerning the number of nodes in a connection path, such as a maximum, minimum, or exact number of nodes separating the user with the target member. For instance, the user may desire to view a visual representation of all connection paths between the user and a target member, where the number of nodes between the user and the target member is two or less. Accordingly, the pathfinder module will select for presentation only those connection paths satisfying the specified requirements, and will generally present the selected connection paths in an order with the connection path having the highest path score presented first. Additionally, with some embodiments, various controls may allow the user to explicitly select other connection path parameters that influence the algorithm used to derive the path scores for the connection paths. Further detail about the technological operation of social networks useful in embodiments hereof may be found in U.S. patent application Ser. No. 13/430,284 entitled "Leveraging a Social Graph for use with Electronic Messaging," assigned to the assignee of this patent, and incorporated herein by reference in its entirety. Various embodiments of the inventive subject matter presented herein provide the aforementioned features and advantages, as well as other advantages, which will be readily apparent from the following description of the various figures. FIG. 1 is a block diagram illustrating various functional components of a social network system 10 with a pathfinder module 16 for use with a wide variety of applications and specifically for identifying, and then presenting, connection paths connecting a user or user-specified entity with a target member of the social network service, consistent with some embodiments of the invention. As shown in FIG. 1, the social network system 10 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social network system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end consists of a user interface module (e.g., a web server) 12, which receives requests from various client-computing devices, and communicates appropriate responses to the requesting client devices. For example, the user interface module(s) 12 may receive requests in the form of Hypertext Transport Protocol (HTTP) requests, or other web-based, application programming interface (API) requests. The client devices (not shown) may be executing conventional web browser applications, or applications that have been developed for a specific platform to include any of a wide variety of mobile devices and operating systems.

As shown in FIG. 1, the data layer includes several databases, including databases 18 for storing data for various entities of the social graph, including member profiles 18, company profiles 20, educational institution profiles 22, as well as information concerning various online or offline groups 24. In addition, the graph data structure is implemented with a graph database 26, which is a particular type of database that uses graph structures with nodes, edges, and properties to represent and store data. Of course, with various alternative embodiments, any number of other entities might be included in the social graph, and as such, various other databases may be used to store data corresponding with other entities.

Consistent with some embodiments, when a person initially registers to become a member of the social network service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored, for example, in the database with reference number 18.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity, which may or may not be included in the social graph. Various other types of relationships that may exist between different entities, and represented in the social graph data 26, are described in connection with FIG. 3.

The social network service may provide a broad range of other applications and services that allow members the opportunity to share and receive information, often customized to the interests of the member. For example, with some embodiments, the social network service may include a photo sharing application that allows members to upload and share photos with other members. As such, at least with some embodiments, a photograph may be a property or entity included within a social graph. With some embodiments, members of a social network service may be able to self-organize into groups, or interest groups, organized around a subject matter or topic of interest. Accordingly, the data for a group may be stored in database 24. When a member joins a group, his or her membership in the group will be reflected in the social graph data stored in the database with reference number 26. With some embodiments, members may subscribe to or join groups affiliated with one or more companies. For instance, with some embodiments, members of the social network service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modelled with the social graph data of the database with reference number 26.

The application logic layer includes various application server modules 14, which, in conjunction with the user interface module(s) 12, generates various user interfaces (e.g., web pages) with data retrieved from various data sources in the data layer. With some embodiments, individual application server modules 14 are used to implement the functionality associated with various applications, services and features of the social network service. For instance, a messaging application, such as an email application, an instant messaging application, or some hybrid or variation of the two, may be implemented with one or more application server modules 14. Similarly, a search engine enabling users to search for and browse member profiles may be implemented with one or more application server modules 14. Of course, other applications or services that utilize the pathfinder module 16 may be separately embodied in their own application server modules 14.

In addition to the various application server modules 14, the application logic layer includes the pathfinder module 16. As illustrated in FIG. 1, with some embodiments the pathfinder module 16 is implemented as a service that operates in conjunction with various application server modules 14. For instance, any number of individual application server modules 14 can invoke the functionality of the pathfinder module 16, to include an application server module associated with a messaging application and/or an application server module associated with an application to facilitate the viewing of member profiles. However, with various alternative embodiments, the pathfinder module may be implemented as its own application server module such that it operates as a stand-alone application. With some embodiments, the pathfinder module may include or have an associated publicly available application programming interface (API) that enables third-party applications to invoke the functionality of the pathfinder module.

Generally, the pathfinder module 16 takes as input parameters that, at a minimum, identify two different nodes corresponding with two entities (e.g., two persons, or a person and a company, etc.) in a social graph that is implemented with a graph data structure (e.g., social graph data 26). Using the input parameters, the pathfinder module 16 analyses the social graph data 26 to identify the connection paths in the social graph that connect the two entities, if any exist. With some embodiments, additional input parameters may be provided to the pathfinder module 16 and used to refine the connection paths selected for potential presentation to the user. These parameters include, for example, filtering criterion to include or exclude connection paths having particular entities, or particular entity types, or specific edge types. Once the set of connection paths satisfying the input parameters has been identified, the pathfinder module 16 derives a path score for each connection path, for example, by aggregating the individual edge scores for the edges that connect the different nodes included in the connection paths. Finally, the pathfinder module provides the information corresponding with the connection paths to the application that invoked the pathfinder module so that a visual representation of one or more connection paths can be presented to the user.

The pathfinder module 16 can be invoked from a wide variety of applications. In the context of a messaging application (e.g., email application, instant messaging application, or some similar application), the pathfinder module 16 may be invoked to provide a message sender with a visual representation of a connection path between the message sender and a person to whom the message sender has addressed a message (e.g., the message recipient). Similarly, the pathfinder module 16 may be invoked to provide a message sender with a visual representation of a connection path connecting an entity on whose behalf the message sender is acting (e.g., company, group, or other organization) with a message recipient. An example of such an embodiment of the invention is illustrated and described in connection with FIGS. 9 through 13. In the context of an application that allows one to browse member profiles, the pathfinder module 16 may be invoked to present to the viewing user a connection path from the user to a target member whose profile is being viewed by the user. An example of such an embodiment of the invention is illustrated and described in connection with FIGS. 14 through 16.

Figure 2:
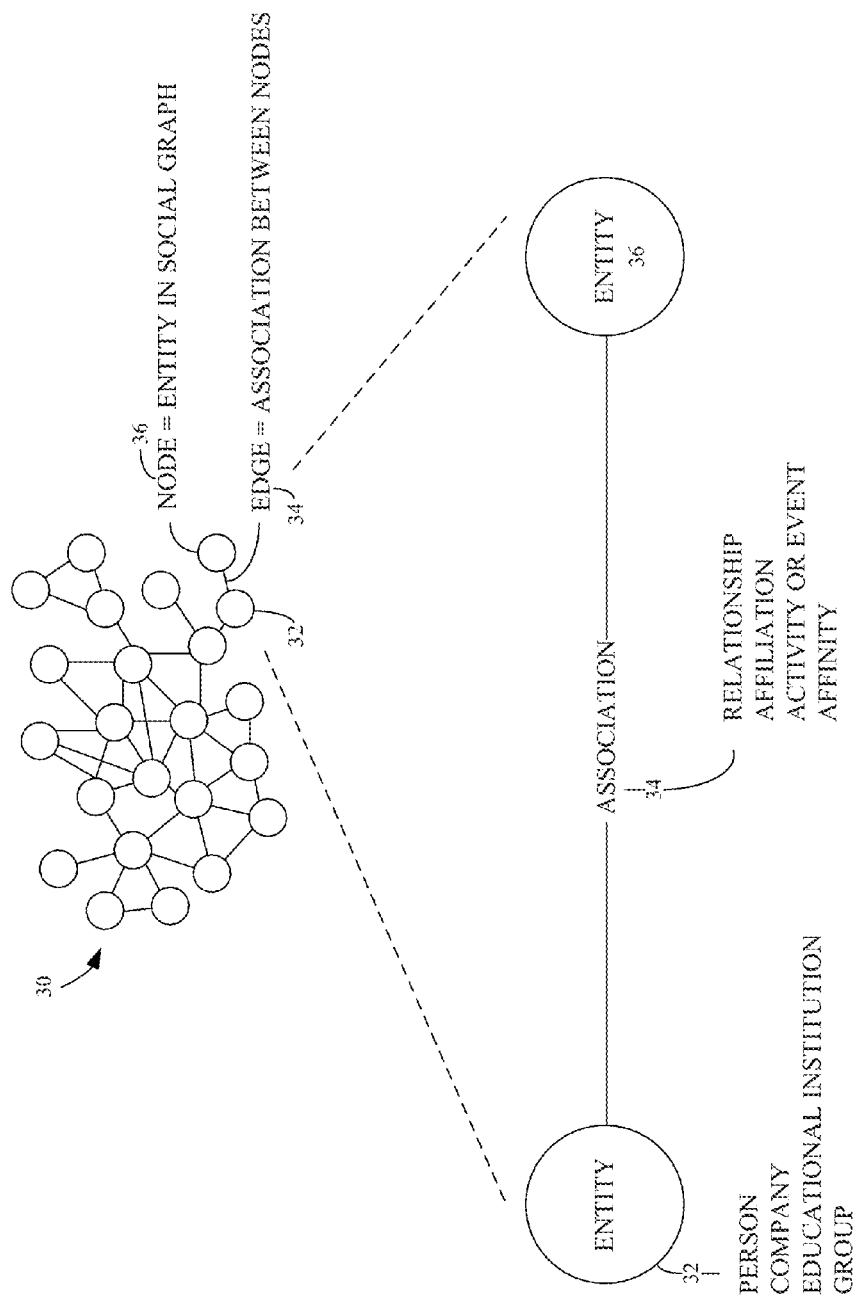
FIG. 2 is a block diagram illustrating an example of a portion of a graph data structure for modelling a social graph, according to some embodiments of the invention.

FIG. 2 is a block diagram illustrating an example of a portion of a graph data structure 30 for implementing a social graph, according to some embodiments of the invention. As illustrated in FIG. 2, the graph data structure 30 consists of nodes connected by edges. For instance, the node with reference number 32 is connected to the node with reference number 36 by means of the edge with reference number 34. Each node in the graph data structure represents an entity in the social graph. With some embodiments, any number of entity types may be included in the social graph. For example, as illustrated in FIG. 2, the entity types that exist in one implementation of a social graph that is consistent with an embodiment of the invention are: a person, a company, an educational institution (e.g., college, school or university), and a group (e.g., an online group, hosted by the social network service, or some other third party server system, or, a real-world organization, such as a professional organization.) The edges that connect any two nodes can represent a wide variety of different associations. For example, in general, an edge may represent a relationship, an affiliation, an activity or event, or some other affinity shared in common between two entities. Although not exhaustive, the various associations presented in the table of FIG. 3 represent some of the many associations that may be mapped to the edges of a social graph data structure to indicate the association between entities in a social graph of a social network service, consistent with some embodiments of the invention.

Referring to FIG. 3, the table with reference number 38 illustrates a non-exhaustive list of associations that may be attributed to an edge connecting two nodes, representing entities, in the social graph data structure. Various edge types or associations may be applicable to all combinations of entity types, while others may be applicable to only a certain subset of combinations of entity types. For example, an edge type representing a "following" relationship may connect two nodes, where each node represents a person, and the edge connecting the two nodes indicates that one person is following the other. Similarly, an edge representing a "following" relationship may connect a first node, representing a person, with a second node, representing a company, to indicate that the person is following the company. Accordingly, the edge type for a "following" relationship applies to the entity type, person, as well as company. Some other associations are only meaningful when applied to an edge connecting certain types of entities.

Some of the various associations or edge types shown in FIG. 3 indicate a particular relationship that exists between two entities represented by nodes in the graph data structure. For instance, two members of the social network service may be directly connected, one member may be following another, one member may be in an address book or contacts list of another, two members may be co-managing a group or co-inventors on a patent, and so forth. In each of these examples, the association or edge type is assigned to the edge connecting the two nodes representing the two entities (e.g., person, company, educational institution, group, etc.)

Some of the various associations or edge types shown in FIG. 3 indicate an activity that is shared in common between two entities, or an activity that involves two entities. For example, a first member may have communicated a message to a second member. A first member may have re-tweeted or forwarded some content item (e.g., a tweet) that was originally generated by a second member. A first member may share an item of content with a second member, or, comment on an item of content posted by a second member, and so forth.

A third category of associations generally involves what may be thought of as affiliations. For example, a member may be affiliated with a company based on current or past employment at the company. A member may be affiliated with an educational institution based on current or past attendance as a student. A member may be affiliated with an online group based on membership in the group.

Another general category of associations or edge types involves what are referred to herein as affinities. For instance, two members may be associated based on an affinity or similarity of profile attributes, such as, the same general geographic location, skills shared in common, employment in the same industry, common degrees or majors, etc. The various associations or edge types that may be assigned to an edge connecting two nodes in a graph data structure presented in FIG. 3 are simply some of the many examples. In various alternative embodiments of the invention, different associations (not shown in FIG. 3) may also be used, particularly with embodiments of the invention that have additional entity types other than the specific examples presented herein (e.g., person, company, educational institution, group).

Figure 4:
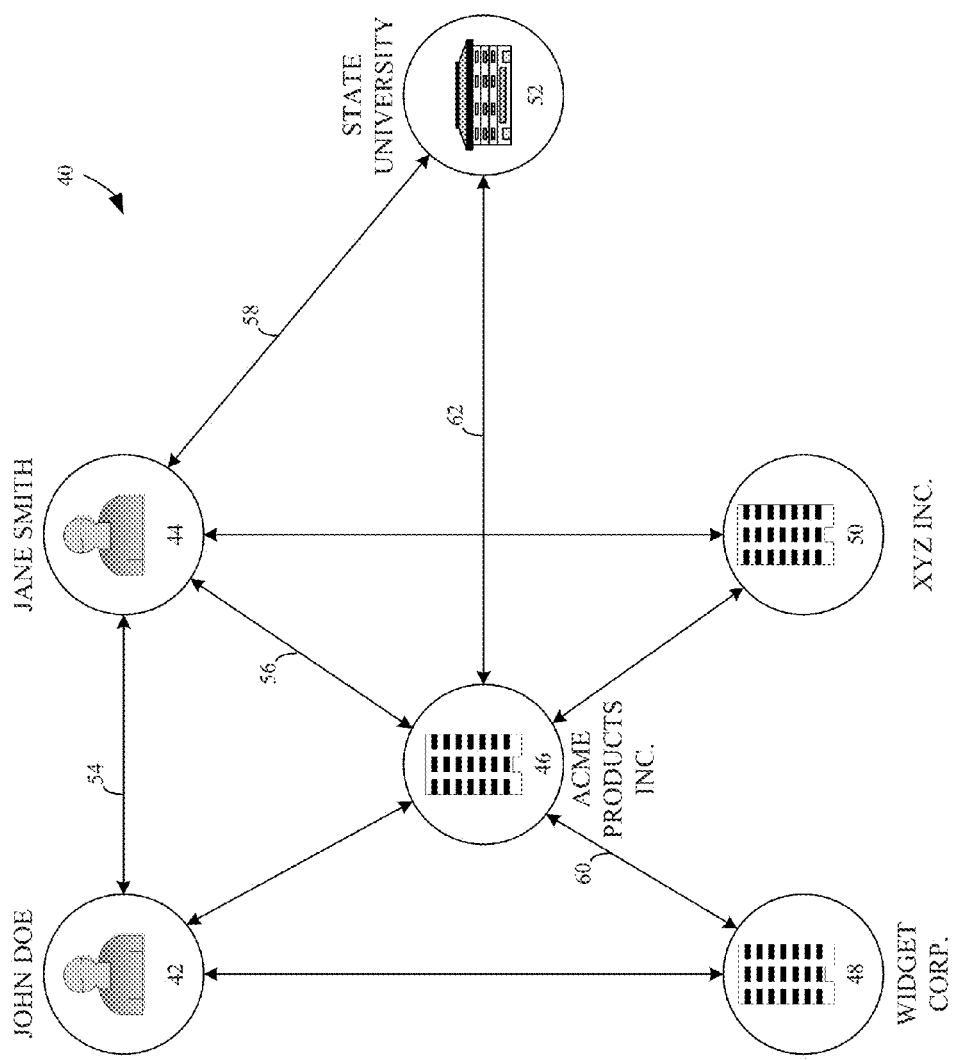
FIG. 4 is a block diagram illustrating an example of a generalized social graph containing nodes of several entity types including members, companies, and schools, consistent with some embodiments of the invention.

FIG. 4 is a diagram illustrating an example of a generalized social graph 40 containing nodes representing several different entities, having varying entity types including members, companies, and schools. Member nodes include John Doe 42 and Jane Smith 44. Company nodes include ACME Products Inc. 46, Widget Corp. 48, and XYZ Inc. 50. There is one school node, State University, with reference number 52. The graph contains edges connecting nodes representing entities of either the same or different types. For example, there is an edge 54 connecting John Doe with Jane Smith, reflecting the fact that John and Jane are directly connected to each other. This edge 54 may be assigned an edge score or weight indicating the strength of the connection between John and Jane. For example, with some embodiments, the weight can be computed using a measure of the overlap between the member connections in John's network and Jane's network. That is, for two members M1 and M2, $W(M1, M2)=Conn(M1, M2)/SQRT[Conn(M1)*Conn(M2)]$ where $W(M1, M2)$ denotes the weight of the edge connecting M1 and M2, $Conn(M1, M2)$ denotes the number of direct member connections that M1 and M2 have in common, $Conn(M1)$ denotes the total number of direct member connections in M1's network, and $Conn(M2)$ denotes the total number of direct member connections in M2's network. Alternatively, the weight for this edge 54 can be determined based on a statistical estimate of the probability that John and Jane know each other, or by other algorithms or techniques or combinations thereof.

Referring again to FIG. 4, there is an edge 56 connecting Jane Smith to ACME Products Inc., which represents Jane's affiliation with ACME Products Inc., as the executive chairman and founder of the company. The score or weight assigned to this edge 56 indicates the strength of this affiliation. For example, with some embodiments, the weight can be computed based on the overlap between Jane's network and the network of ACME Products Inc., where the node in the social graph representing ACME Products Inc. is connected to each member who is a current or former employee of the company. That is, for a member M1 and a company C1, $W(M1, C1)=Conn(M1, C1)/SQRT[(Conn(M1)*Conn(C1)]$ where $W(M1, C1)$ denotes the weight of the edge connecting M1 and C1, $Conn(M1, C1)$ denotes the number of members M1 is connected to who are also current or past employees of C1, $Conn(M1)$ denotes the total number of connections in M1's network, and $Conn(C1)$ denotes the total number of members who are current or past employees of C1. Similarly, there is an edge 58 connecting Jane Smith to State University 52, which represents Jane's affiliation with State University as an alumnus of the university. The weight of this edge indicates the strength of this affiliation. For example, the weight of an edge connecting a member M1 and a school S1 could be computed as $W(M1, S1)=Conn(M1, S1)/Conn(M1)$, where $Conn(M1, S1)$ denotes the number of members M1 is connected to who are also students or alumni of S1, and $Conn(M1)$ denotes the total number of member connections in M1's network.

There is an edge 60 connecting ACME Products Inc., with Widget Corp., which represents the association between the two companies. An association between two companies can exist for a variety of reasons, for example, if they share a common founder, if some members of the social network service have been employed at both companies, if one company is a subsidiary of the other, or if the two companies are business partners. In this particular example, ACME Products Inc. and Widget Corp. are connected because a large number of former Widget Corp. employees are currently employed with ACME Products Inc. The weight of the edge denotes the strength of the association. For example, the weight of an edge connecting two companies C1 and C2 could be computed as $W(C1, C2)=Conn(C1, C2)/SQRT[Conn(C1)*Conn(C2)]$, where $Conn(C1, C2)$ denotes the number of members who have worked at both C1 and C2, and $Conn(C1)$ and $Conn(C2)$ denote the number of members who have worked at C1 and C2 respectively. Similarly, there is an edge 62 connecting ACME Products Inc. with State University, which represents the association between the company and the school. This association can exist for a variety of reasons, for example, if graduates of the school or students at the school are employed by the company. Again, the weight assigned to the edge 62 indicates the strength of the association. For example, the weight of an edge connecting a company C1 with a school S1 could be computed as $W(C1, S1)=Conn(C1, S1)/SQRT[(Conn(C1)*Conn(S1)]$, where $Conn(C1, S1)$ denotes the number of members employed by company C1 who attend or have attended school S1, $Conn(C1)$ denotes the number of members employed by C1, and $Conn(S1)$ denotes the total number of members who attend or have attended S1.

Figure 5:
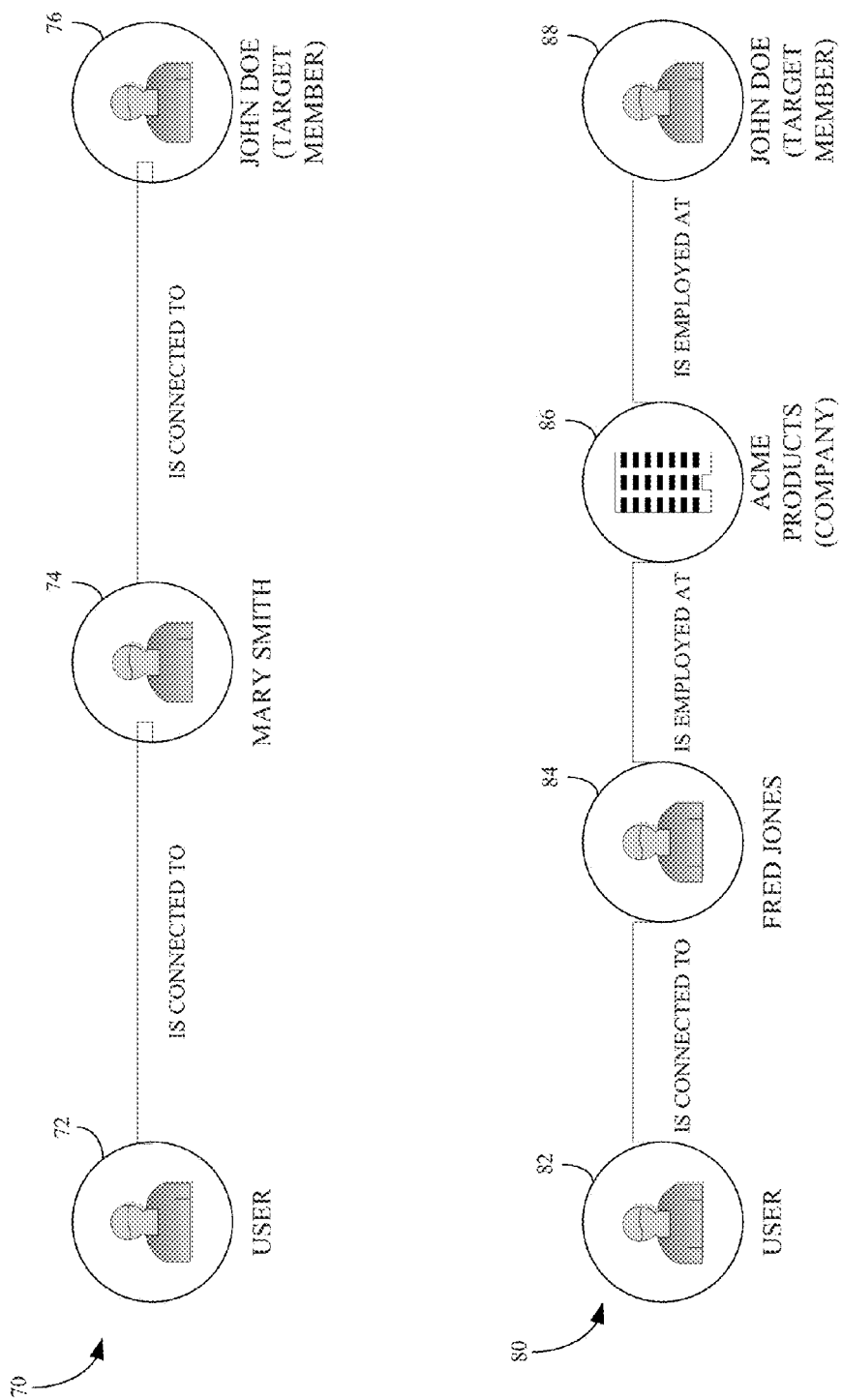
FIG. 5 is a block diagram illustrating some examples of connection paths in a social graph connecting a user with a target member, consistent with embodiments of the invention.

FIG. 5 is a block diagram illustrating some examples of connection paths in a social graph connecting a user with a target member, consistent with embodiments of the invention. As the term is used herein, a "connection path" is simply a nodal path through a graph data structure that connects two specific nodes (entities in a social graph). Referring to FIG. 5, in the example connection path with reference number 70, the user, who is represented by the node with reference number 72, is directly connected to the member, Mary Smith, represented by the node with reference number 74. In turn, Mary Smith is directly connected to the target member, John Doe, represented by the node with reference number 76. In this relatively straightforward and simple example, only a single node 74 separates the user 72 and the target member 76, and only one edge type (i.e., a direct connection) is involved.

In the example connection path with reference number 80, the user, represented by the node with reference number 82, is directly connected to the member, Fred Jones, represented by the node with reference number 84. In turn, Fred Jones is an employee of the same company (e.g., ACME Products Inc., represented by the node with reference number 86) at which the target member, John Doe (node with reference number 88), is employed. Accordingly, this example connection path 80 involves two different node types (e.g., a person and a company), and two different edge types (e.g., a direct connection and an employment relationship).

Given the various associations that may exist between entities, for example, as set forth in the table of FIG. 3, it is readily apparent that in many instances, there may be a significant number of connection paths connecting two persons, or an entity (e.g., a company) with a person, such that one or more of the connection paths may not be obvious or immediately apparent to the user. Furthermore, as these two different example connection paths 70 and 80 make apparent, the entity and edge types or associations involved in a particular connection path will often make one connection path more relevant with respect to a particular task or objective than another connection path. Accordingly, with some embodiments of the invention, after identifying a set of connection paths connecting a user with a target member, or, a user-specified entity with a target member, the pathfinder module will generate a path score for each connection path identified. With some embodiments, the path score for each individual connection path will be dependent upon the individual edge scores assigned to the edges connecting the nodes in the connection path. With some embodiments of the invention, different algorithms may be automatically used to derive path scores for different applications or tasks. The particular algorithm used to derive the path score may be automatically and dynamically selected, for example, based on a determination of what the user is attempting to achieve. Alternatively, with some embodiments, the user may make an explicit selection (e.g., by specifying a type or category of message, or, a purpose for contacting someone), which will then influence the algorithm used to derive the path scores. Consequently, the edge scores or weights for different edge types may be derived differently, for example, to increase or decrease the influence of edge scores of certain types of edges on the path score, depending upon the particular application that has invoked the pathfinder module, or a particular task or process being undertaken or performed.

With some embodiments, the application invoking the pathfinder module may filter the connection paths output by the pathfinder module, or modify the scores or ordering of the connection paths, by using additional methods or algorithms that customize the output of the pathfinder module for the needs of the particular application. For example, an application that identifies intermediate members in a social network who may be able to introduce the user to a target member could adjust the scores of the intermediate members based on data concerning the historical or past activities undertaken by those members within the context of the social network service.

Figure 7:
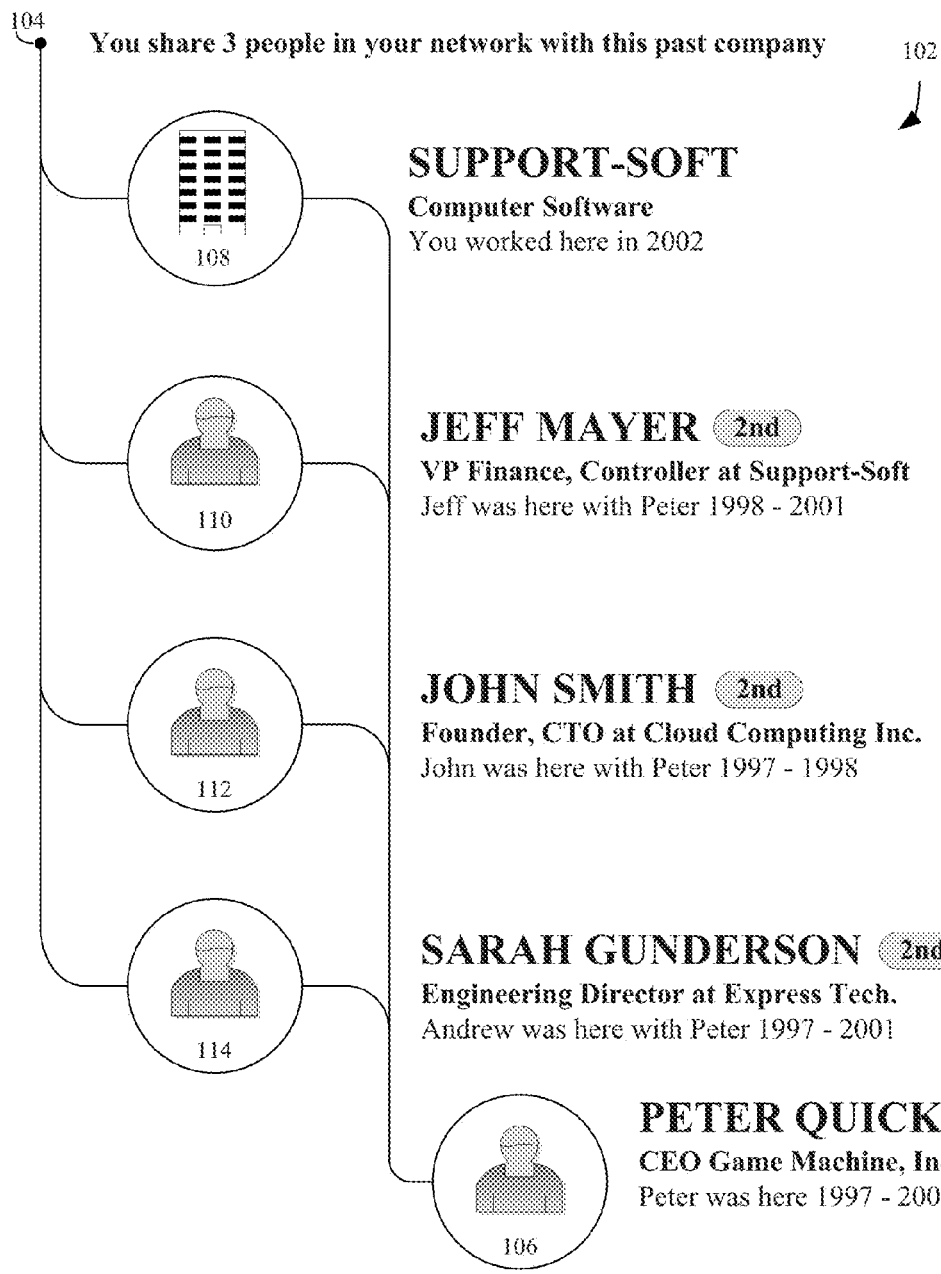
Figure 8:
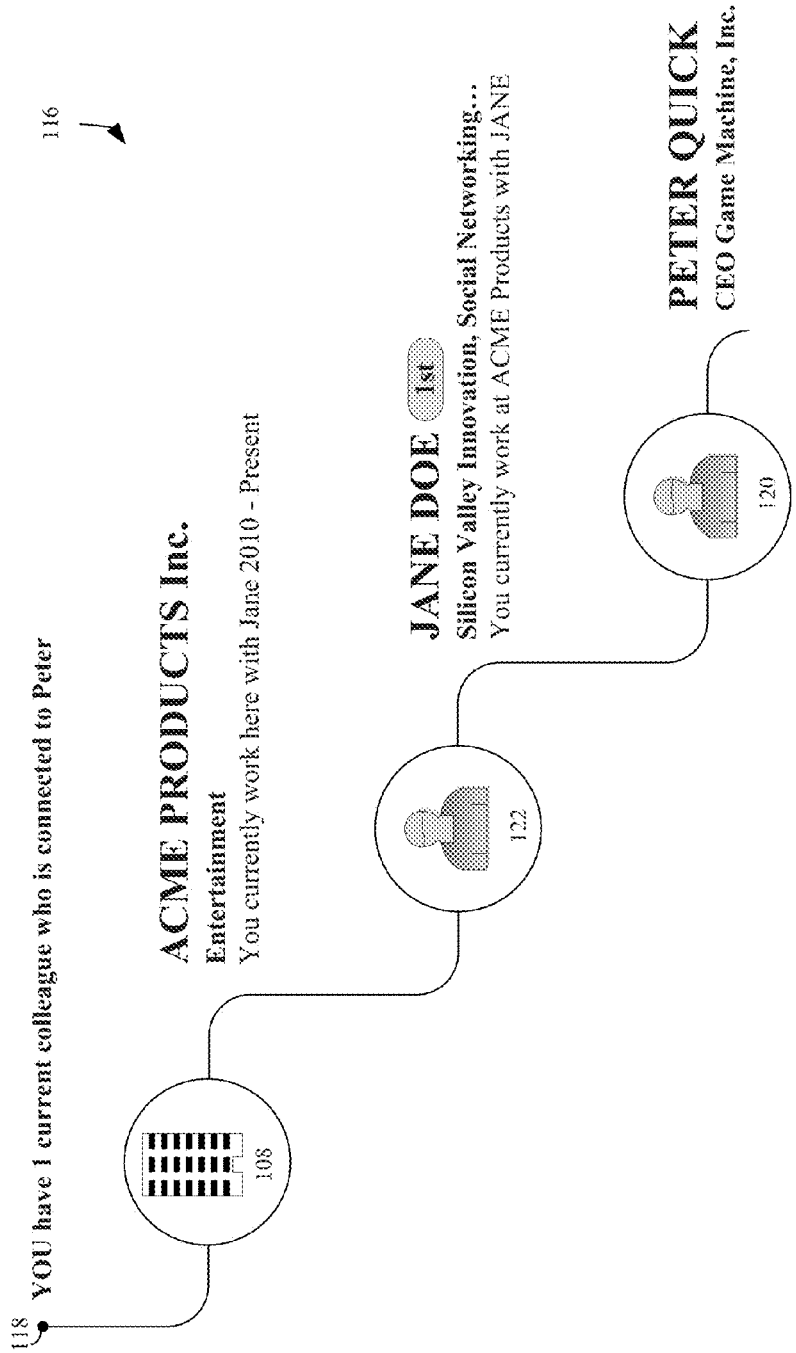

The presentation of the visual representation of the connection path or paths can vary significantly from one application to the next, and from one embodiment of the invention to the next. Without any intent to limit the scope of what is claimed, FIGS. 6 through 8 present various examples of user interfaces that convey a visual representation of connection paths in a social graph connecting a user with a target member, consistent with some embodiments of the invention. These example user interfaces represent user interface elements that might be used in any type of application to present contextual information concerning a connection path between a user and another member of a social network service.

As illustrated in FIG. 6, the example user interface 90 shows a visual representation of three different connection paths having an equal number of nodes (e.g., entities) and the same type of edges (e.g., association). Specifically, in this example, the user represented by "YOU" has seven direct connections (e.g., person-to-person relationships established via the social network service) that are also directly connected to the target member 98. Of those seven connections, three are visually presented in the user interface element while the other four are accessible to the user via the button or link 100 corresponding with the text, "SEE 4 MORE." With some embodiments, when multiple connection paths exist with the same number of nodes and the same edge types, all or a specific subset of the connection paths may be presented in parallel, as shown in FIG. 6. Generally, the order in which the connection paths are presented will be dependent upon the connection strength, as indicated by the path score derived for the various connection paths. For instance, in the example of FIG. 6, the connection path including the node with reference number 92 is presumed to be a stronger, or more relevant, connection path than the connection path including the node with reference number 94.

While the connection paths associated with the user interface element of FIG. 6 involve a direct connection as an edge type, the visual representation of the connection paths corresponding with FIG. 7 involve an employment relationship with a company. Specifically, the user interface element 102 shown in FIG. 7 indicates that the user (represented by the point with reference number 104) has three people in his broader network (e.g., within the social graph) who are connected to the target member and who were at one time or another employed with the same company at which the user and the target member (e.g., Peter Quick, with reference number 106) were at one time employed. In this example, the company (e.g., Support-Soft.) is represented by the user interface element with reference number 108, while the individual members, and thus the separate connection paths, and are represented by the user interface elements with reference numbers 110, 112 and 114. In this particular example, as indicated by the textual descriptions positioned next to each user interface element that corresponds with a node from the social graph, the members forming the connection path to the target member 106 are second level, or second degree, connections of the user 104. With some embodiments, the user may interact with the individual user interface elements 110, 112, 114, for example, by manipulating a cursor control device or interacting with a touch sensitive display, to select or hover over a user interface element, causing additional information to be presented. The additional information may include information concerning the various first level, or first degree, connections, who the user 104 shares in common with the members represented by the user interface elements with reference numbers 110, 112, and 114, forming the connection paths with the target member 106, as shown in FIG. 7.

FIG. 8 illustrates a third example of a user interface 116 that includes a visual representation of a connection path, consistent with some embodiments of the invention. As illustrated in FIG. 8, the connection path from the user 118 to the target member 120 involves a current colleague of the user 122, who is directly connected to the target member 120. For example, the user is represented in the connection path by the circle with reference number 118. Both the user and Jane Doe, represented by the user interface element with reference number 122, are currently employed at the company, ACME Products, Inc. 108, and Jane Doe is a direct connection of the target member, Peter Quick 120.

The particular user interfaces shown in FIGS. 6, 7 and 8 are simply examples of how a connection path may be conveyed in accordance with some embodiments of the invention. The particular examples might be used as a portion of a user interface for any number of different applications. Other embodiments of the invention may use visual representations of the connection path that differ from those shown in FIGS. 6, 7 and 8. Specifically, with some embodiments, a visual representation of a connection path may not include any parallel paths, but instead, each individual connection path may be shown as a series of nodes representing different entities. With some embodiments, only a subset of the nodes in a particular connection path may be visually represented. Alternatively, with some embodiments, each and every node in a connection path is included in the visual representation.

People's relationships are one primary kind of knowledge available on social network services. For example, in the physical world, there are varieties of relationships such as friends, colleagues, acquaintances, and the like, and these relationships are also online in member profiles of social network services such as Facebook, LinkedIn, or Google+. Relationship mining on social network services is becoming important. Such mining may use latent information as opposed to explicit relationships, i.e., in explicit relationships one has background knowledge to follow in addition to the data uncovered from the target relationship. For example, people can discover advisor-advisee relationships in an academic collaboration network using the background knowledge of the properties of publication and collaboration records. Given the publication and collaboration records of two authors, a guess can be made with high probability whether the one author is the other's student, based on background knowledge of academic training. However, in many practical cases, there are no such explicit clues. The relationships are latent when there is little or no background knowledge. For example, on the professional social networking system, managers may have connections with their employees. Although this manager-employee relationship exists of the social network, inferring it is extremely difficult. Due to its latent nature, none of the features like connections, job titles, working experiences explicitly indicate working relationships directly. Furthermore, the relationship can be hierarchical such as in an organization chart. For example, from pairwise manager-employee relationship, we can build the organization structure of a whole company can be built. However, hierarchy construction from local pairwise relationship prediction tends to be a challenging problem. But latent social relationships can be inferred and used to construct hierarchy from heterogeneous data sources using concepts in physics to design a force-based schema to integrate the information from heterogeneous sources harmonically to predict the pairwise latent relationship. Use may be made of the objective entanglement group and subjective coherence strength concepts to capture the latent relationships from objective and subjective perspectives. These features may then be used to compute local probability of a latent relationship. A local probabilistic function may be designed based on the physics principle of escape velocity. Then, a global hierarchy such as an organization chart may be constructed using a Reduced Markov Decision Process (RMDP), which utilizes local pairwise relationships.

In social networks, a relationship may be said to be latent when there is no background knowledge about the relationship, in addition to the data, that helps in inferring the relationship itself. On a professional social network system, a manager-employee relationship is latent. Given the job titles and personal connections of two professionals in the same company, it is very difficult, if not impossible, to make a confident guess on whether one person is the other's manager, since there is no background knowledge about the relationship between the two. Job titles are supplied by users, which could be different even for the same or a similar job. For example, a person doing data mining job in a company could represent him/herself as "data miner", "software engineer", "data specialist", "data scientist", or "data person". It is very rare for a person to have a title like "software engineer on data mining in company A", and another person to have a title like "manager of software engineer of data mining in company A." Further, the order of joining a company is not a good indicator either. A person joining earlier could not necessarily be another person's manager. Also, there are usually no publication records in a professional social network service. We cannot see things like "project collaboration history" of people. Given that as a fact, there is no direct way to tell whether two people have worked on anything together before. This illustrates a lack of background knowledge in a social network service.

Social Network in a Classical Mechanics View

The insight to solving problems in social network research sometimes lies in physics. For example, if nodes of a social graph are treated as stars, the social network service is like the universe. The interactions between nodes are like forces between planets. The latent relationship between two nodes share common properties with the escape velocity between a star and a planet. The relationships are asymmetric. The escape velocities are different depending on whether it is a star escaping form a planet or a planet from a star. Likewise, the relationship of members in a social network service is asymmetric. For example, the probability of member A being member B's manager is different from the probability of member B being member A's manager. Further, they both depend on nodes' properties, whether it is mass difference in the planetary example or seniority or capability difference in the social network example. Also, the distances among nodes, whether in the universe or a social network, have impact on relationships/interactions among them. Therefore, the concept of escape velocity can be used to model the latent relationship.

Objective Entanglement Strength

Figure 9:
FIG. 9 illustrates an example of objective entanglement.

On a social network, even though it may be known that there is the manager-employee relationship within a manager's connections, which of the manager's connections are those employees is not known directly. However, the fact that employees do not explicitly mark themselves as the working relationships cannot stop others treating them as if they work together. For example, if the general users often view the person A and her particular connection B together, which may be called co-viewing, it is an objective indication that A and B probably share something in common. If they work for the same company, they may have fairly strong working relationship or job similarity. Therefore, even if the relationship is latent with no explicit marks, A and B are entangled together by the objective opinion of general users. FIG. 9 is an example of objective entanglement. People who viewed President Obama's profile on a professional social network also viewed Governor Romney's and Secretary of State Clinton's profiles with high frequencies. The latter two are entangled with President Obama by public opinion. Therefore, a feature that is useful for inferring latent relationship is objective entanglement strength.

Figure 10:
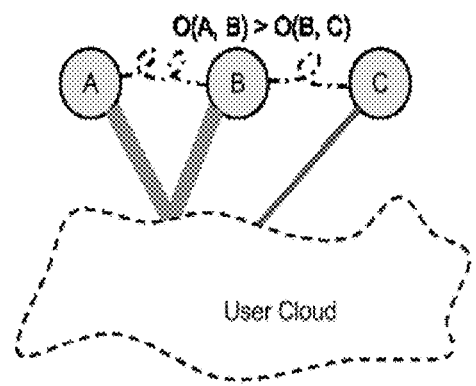
FIG. 10 illustrates objective entanglement as recognized by a crowd of observers.

Objective entanglement strength may be expressed mathematically as the Objective Entanglement Strength (OES) between entity x and y is O(x, y). OES quantifies the objective similarity of x and y. Objective entanglement is a phenomenon of a small group of people being recognized as closely related to each other by the general crowd. FIG. 10 illustrates this point. Without heavily investigating their other information, and using only the "intelligence of the crowd," there is an indication that the latent relationship exists with higher probability between A and B than B and C.

There are customized ways to quantify the OES for user pairs for different scenario. Item-based collaborative filtering to generate a score of "objective entangled strength" to measure how a pair of users entangles from objective perspective. Collaborative filtering is essentially based on co-view data.

To reduce the computation cost and maintain the utility for our model, we only compute the OES score for directly connected nodes that are within the same company.

$$O(x,y) = \cos(\sigma(Ux), \sigma(Uy)),$$

where

Ux and Uy are the vector of users who have seen x's profile and y's profile respectively, and σ is a normalization function.

Figure 11:
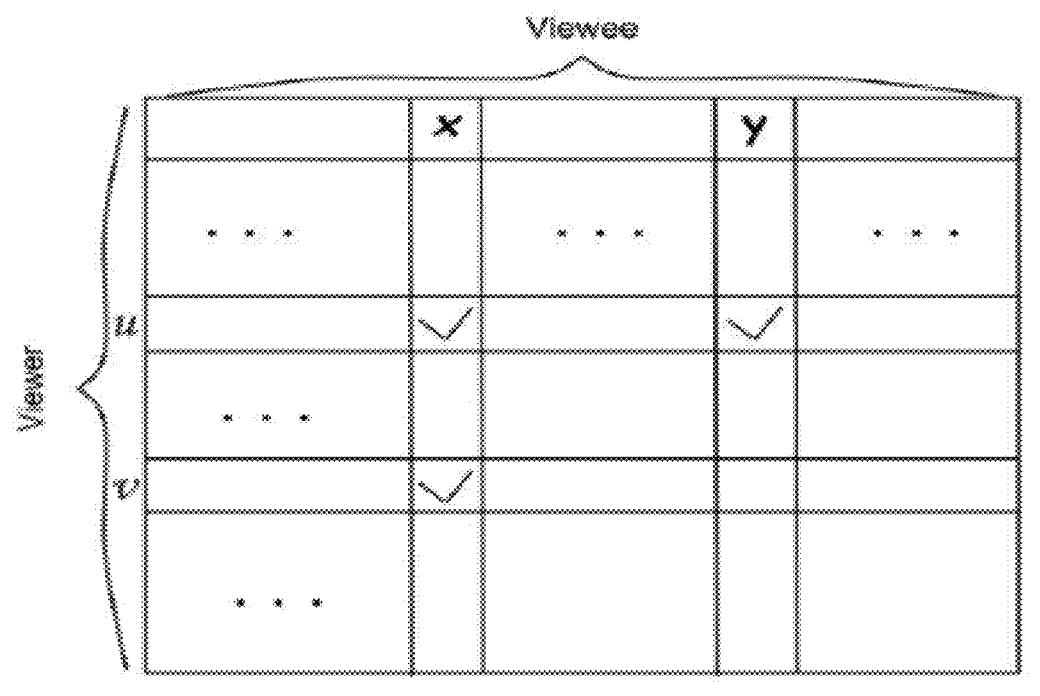

FIG. 11 illustrates an example of generating a score of "objective entangled strength" to measure how a pair of members entangle from objective perspective. For computational purposes, it may be decided to reduce the computation cost and maintain the utility for our model, by computing the OES score only for directly connected nodes that are within the same company. The result could reflect relatively close working functions. However, the hierarchy relationship is still missing. We will further explore other properties to refine the model.

Subjective Coherence Strength

Besides objective clues, subjective clues are also valuable for latent relationship discovery. Subjective coherence of a group of people is the relationship strength that is formed voluntary by themselves. There are two such subjective coherences that could be used for the social network service.

Relationship Distance

Figure 12:
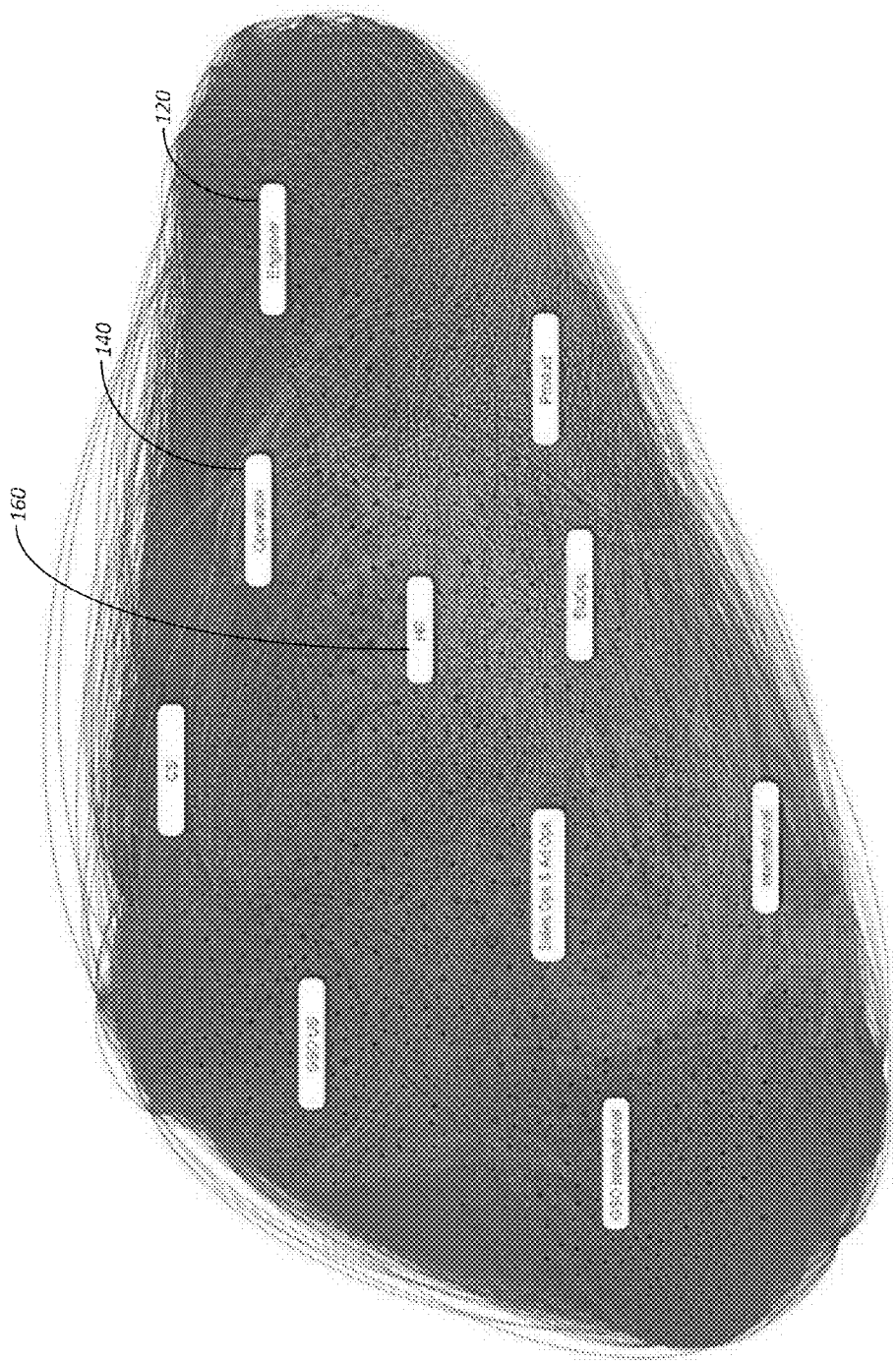
FIG. 12 illustrates the advantages of the Yifan Hu layout over a random layout.

Subjective coherence strength (SCS) for a pair of nodes x and y may be written as S(x, y), which quantifies subjective closeness between x and y. When people connect to each other on a social network, they choose their connections based on their subjective preference. Therefore, the connections reflect their real social relationship to some extent. For example, on a professional networking scenario, people make connections based on their careers. If a group of people are well-connected, e.g., their connection forms a complete graph, they have a higher chance of having similar job functions. If they are from the same company, they are probably co-workers. FIG. 12 illustrates such an example. It is the connection graph of a company where different shades mark different communities, such as Engineering Operations 140, Human resources, 160, and the like, which happen to have different job functions. Thus, people are "geologically" close to others who are their co-workers in this type of graph. Since the connection graph is subjectively formed, subjective coherent strength to may be used to measure how close people are.

One way to capture the SCS between two nodes is to use the "distance" between them. Since each connection is subjectively formed, nodes distance is a natural measure of their closeness. The Yifan Hu graph layout method may be used compute the subjective coherence strength. The algorithm is a multi-layer force based graph drawing method and has been widely implemented in computation and graph visualization tools. This can be seen in more detail in the paper *Efficient and High Quality Force-Directed Graph Drawing* by Yifan Hu, Wolfram Research, Inc., Champaign, Ill. 61820. That paper, which is incorporated herein by reference in its entirety, may also be found at: http://www2.research.att.com/~yifanhu/PUB/graph_draw_small.pdf.

Figure 13:
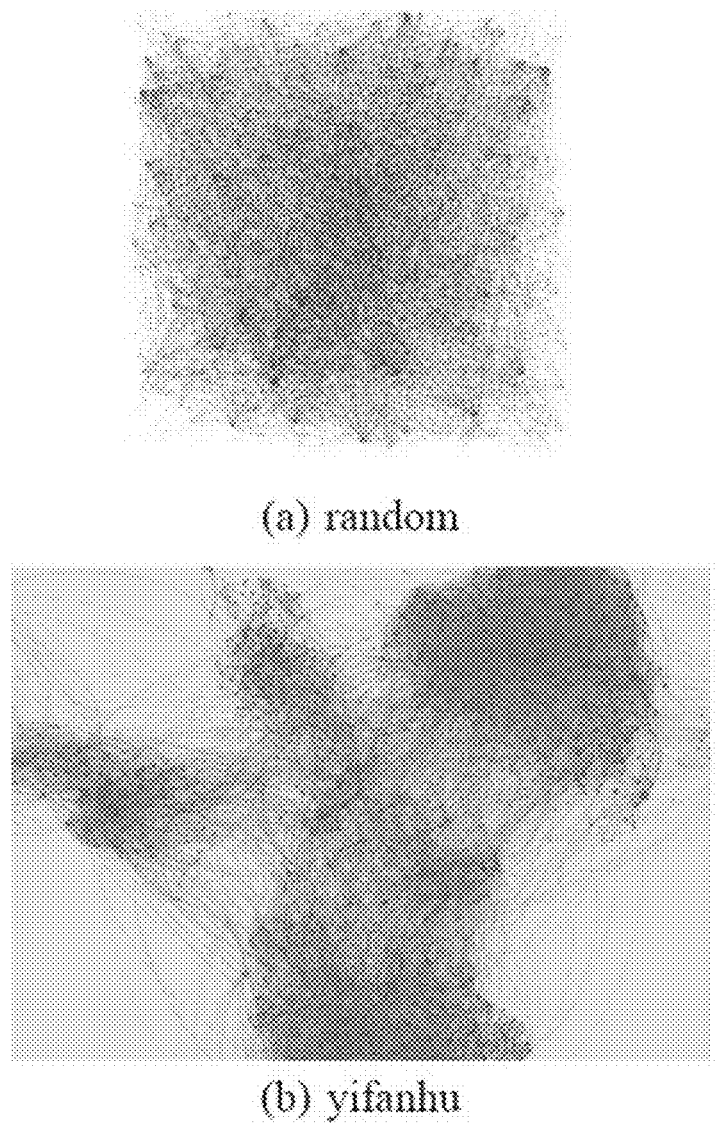
FIG. 13 illustrates a group of people having at least partially the same job title in an organization, in pictorial format.

One example of the algorithm may be Algorithm 2 beginning at page 17 of that paper. Originally, the objective of the Yifan Hu algorithm was to come up with an arrangement of nodes and edges for a graph, so that the layout of it is aesthetic, i.e., node communities are clear and edge overlaps are minimum. FIG. 13 illustrates the advantages of the Yifan Hu layout over a random layout. The Yifan Hu layout is a better reflection of network structures as well as a fast method that suits large graphs. The algorithm produces two-dimensional coordinates for nodes and may be used to compute node distances using a Euclidean scheme. Such distance measure is a good indicator of the closeness of working relationships and is finer-grained than shortest path distance, and reflecting more structural information than the random walk commute distance. As a further explanation, FIG. 12 may be generated from the entire professional social network connection data set using the Yifan Hu algorithm. The purpose of FIG. 12 is to illustrate that the relation strength can somehow capture job functions. FIGS. 13(a) and 13(b) are generated on the same connection data set (for example a part of the professional social network's connections). The layout of FIG. 13(a) is randomly generated, whereas the layout of FIG. 13(b) is generated by the Yifan Hu algorithm. The purpose of these two figures is to demonstrate that the Yifan Hu approach can effectively represent relation strength, whereas random layout may fail.

However, people that are "far" from each other do not necessarily have different job functions. So attempting to determine a company's entire connection graph from distance alone would give inaccurate results. The reason for that is the whole graph distance calculation could dilute the force of surrounding nodes for every node. When considering the force among a node and its neighbors, many neighbor nodes are pulled away by their own neighbors/communities. To resolve this, distances for nodes may be more reliably computed by using what may be called their ego network.

The ego network of node u is $\Omega_u = \{N_u, E_{Nu}\}$
where
$N_u$ is the set of adjacent nodes of u
and
$E_{Nu} = \{e_{ij} | i, j \in Nu\}$ is the edges among u's neighbors.

The above may be viewed as meaning that for every node u in the social network service its ego network $\Omega_u$ is extracted and may be used as input to the force based graph layout algorithm to get meaningful distance between u and its neighbors. Such distances are one type of representation of subjective coherence strength.

Local Probability for Latent Relationship

The above features that have been obtained can indicate the latent relationship to some extent, but are not powerful enough to be a clear identifier, and may be integrated in a more meaningful representation of the target latent relationship.

Latent Relationship Candidate Selection

Figures 14, 15:
FIG. 14 illustrates persons having similar job functions in their profiles on a social network service.
FIG. 15 illustrates members of a social network service showing seniority of co-workers.

Even if connections have subjective coherence strength among each other, some have more potential than others as a help in inferring an organization chart from the connections. Therefore the connections may be refined by selecting a candidate subset that has really good potential to have the latent relationship be very useful for inferring the organization chart. This may be performed by using member supplied job title similarity to do the candidate selection. Although, as indicated earlier, member supplied titles may be inaccurate, there include some useful clues. For example, if one titles herself as "data scientist" and the other "intern in data mining," the two persons should have similar job functions, and maybe even be on the same team. FIG. 14 illustrates persons having similar job functions in their profiles on a social network service. Therefore, pairwise job title similarity may be usefully computed. For this purpose the Jaccard similarity measure may be used for the computation, with the computation being for one company at a time, instead of on the whole social network. The title similarity is defined as the following, the same as the Jaccard index.

$$S(t_x, t_y) = \frac{|t_x \cap t_y|}{|t_x \cup t_y|}$$

where $t_x$ and $t_y$ are the sets of words in entity x's and y's titles.

The latent relation candidate set $\Phi_u$ for node u is defined as follows:

$$\Phi_u = \{v | e_{uv} \in E, S(t_u, t_v) > \rho\}$$

where
ρ is a threshold to control the title similarity to be higher than a certain level,
and
E is the set of edges,
and
$e_{uv}$ represents the edge between node u and v.

Pairwise Latent Relationship Probability

Figure 16:
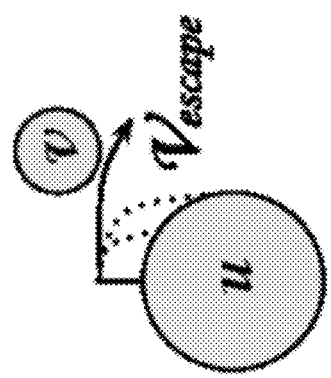
FIG. 16 illustrates the concept of escape velocity in a social network.

Given u and $v \in \Phi_u$, pairwise latent relationship probability may be defined as $p(u \succ v)$. First of all, $p(u \succ v)$ is asymmetric. $p(u \succ v) \neq p(v \succ u)$. The reason is because the latent relationship is hierarchical. Similarly, and as discussed above, the OES and SCS between u and v are also asymmetric. In other words, OES(u, v)≠OES(v, u) and SCS(u, v)≠SCS(v, u). The pairwise latent relationship probability should be a meaningful integration of both subjective and objective features obtained thus far. Subjective coherence gives relationship "distance" and objective entanglement is like the gravity force attracting two nodes. They may be combined using the escape velocity discussed above as a good indicator of such. For an object to "escape" a gravitational field, the escape velocity is the minimum speed needed without further propulsion. When $p(u \succ v)$ is computed, i.e., the chance that u is v's manager in the above domain application case, u may be considered in the social network service to be a gravitational field, or a planet, and v to be a surrounding object that is escaping. This is illustrated in FIG. 16 where the escape velocity of v is $v_{escape}$. The escape velocity of v captures the influence of u on v. In another words, if v needs a larger "velocity" to "escape" from u, u has higher chance to be v's close co-worker or manager. The escape velocity also captures asymmetry well, i.e., u's escape velocity from planet v is different from planet v's escape velocity from u.

The classic form of escape velocity is:

$$v_{escape} = \sqrt{\frac{2GM}{r}},$$

where
G is the universal gravitational constant,
M is the mass of the planet, and
r is the distance from the center of gravity.

Consistent with this form, we may define the measure for the latent hierarchy relation as $$V(x, y) = k\sqrt{\frac{O(x, y)}{S(x, y)}},$$

where
k is a constant,
O(x, y) is similar to the relative mass of x to y,
(x,y) is the force-based distance mentioned earlier
and
S(x, y) denotes the Euclidean distance between node x and y from the force-based layout generated by Yifan Hu's method.

Furthermore, we may translate V(x, y) into the range of (0,1) to get the probability.

$$p(x \succ y) = \frac{2}{e^{-V(x,y)} + 1} - 1$$

Global Hierarchy Construction

The pairwise local probability for latent relationship considers only a target node and all its direct surroundings. It captures only a 1-hop relationship. Getting the pairwise relationship probability estimation is the starting point, rather than final destination for a global hierarchy construction. First, pairwise latent relationship estimation is not accurate enough. For example, in the manager-employee relationship discovery problem, one person usually has only one direct report manager. For a person u and the manager candidate set $\Phi_u$, if we choose $$v=[\arg\max]_v p(v \prec u)$$

as the final prediction result of u's manager, we would have mis-assignments at the pairwise level. Stated another way, the equation denotes the selection of user v which has the highest local probability of being user u's manager as the predicted manager. Furthermore, from the inaccurate pairwise level, the construction of the global hierarchy, e.g. the organization chart in the current application, will be even further from the true structure.

To address this, a global hierarchy construction algorithm may be designed with a two-fold goal. First, the mis-arrangement of pairwise latent relationship may be corrected by utilizing global structure information. Further, the global structure should benefit in accuracy from the improved local prediction.

Figure 17:
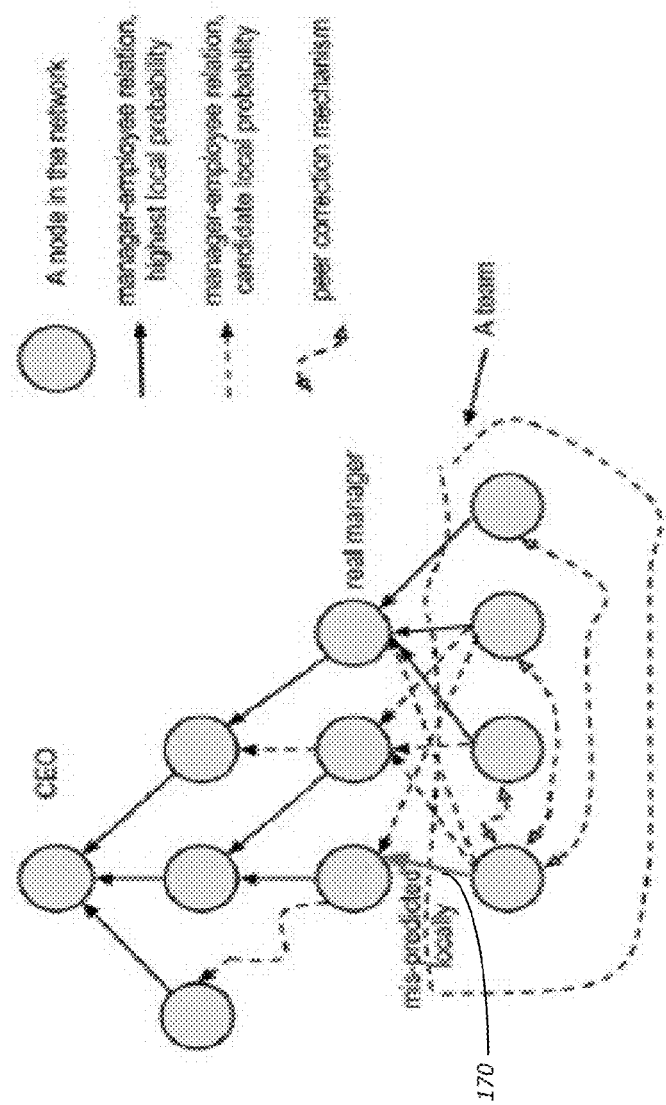
FIG. 17 illustrates mutual benefits for local prediction and global construction of the organization chart.

FIG. 17 illustrates mutual benefits for local prediction and global construction of the organization chart. That figure shows a part of an organization chart prediction in a company, for example, finding the organization chart to the CEO of the company, or finding a meaningful portion of the organization chart to the CEO. The solid-line arrow means the manager prediction with highest pairwise probability, while the dot-line arrows are the prediction with other manager candidates. The solid-line arrow does not necessarily point to real manager. In the example of FIG. 17, consider that arrow 170 points to the wrong manager. Mis-predictions such as this should be corrected using global structure which is not accessible when doing the local pairwise prediction.

There are two types of correction that may be used with the help of additional information from the data, Type I correction and Type II correction.

Type I correction is the peer correction. If a team is reasonably well organized in the raw data, it is very likely to be discovered by the local prediction scheme, as close co-workers tend to be close in the local results. If there is one mis-inference and the majority of the other co-workers' manager are predicted right, the mis-inference can be corrected. FIG. 17 shows arrow 170 is likely to be reassigned given its co-workers' assignments.

Type II correction uses more global structure information. Type II correction may be called efficiency correction. The intuition is that in an efficient working environment, the organization chart paths from every employee to the CEO should be as short as possible. Therefore, we could measure the shortest path between a node and the CEO node. For example, locally, A may be closer to B than C. However, B is a lot further to the CEO than C. In a global setting, A should choose C for a shorter path to the CEO node. The two types of corrections lead to a design of the global structure construction algorithm.

There is another piece of information which may be particularly useful for hierarchy mining Title seniority is an important factor in inferring people's hierarchy. For example, a person with a title "software engineer manager" is almost certainly more senior than a person with a title "software engineer intern". Therefore, after we identify close co-workers, such seniority is important to discover the hierarchy. However, seniority also has drawbacks to prevent or highly recommend against applying seniority directly to predict pairwise latent relation. The major problem is that such seniority is very noisy. For example, a person may have multiple jobs simultaneously. Therefore it is often inaccurate to directly infer seniority from user supplied titles or positions, and it is also inaccurate to infer seniority from other sources of information such as connections in a professional social network service. Nevertheless, seniority may be used as an important feature. FIG. 15 illustrates members of a social network service showing seniority of co-workers. In FIG. 15, Daniel Tunkelang appears to have more seniority than Monica Rogati and Darla Sorokina. Like other noisy yet important features, title may be integrated seniority with other information to make a good component for hierarchy construction. Table 1 lists one example of organized seniorities and the relative number values assigned to them.

| Seniority | Number |
| --- | --- |
| Owner or Founder | 9 |
| Senior Executives | 8 |
| Vice President | 7 |
| Director | 6 |
| Manager | 5 |
| Associate | 4 |
| Entry Level | 3 |
| Intern | 2 |
| Unpaid | 1 |

From an objective perspective, senior level people get more objective impressions than entry level people. For example, a company's CEO and CFO may be viewed a lot more than two interns working in the same group. This phenomenon makes the OES more meaningful and accurate among high level managers, which may better lead our algorithm to discover their latent relationships. From subjective perspective, senior level people have mature connections in terms of size, job functions, and quality. Entry level people tend to have less mature connections, majority of which are also entry level like themselves. This phenomenon also affects the SCS calculation. Last but not the least, usually a company's structure is more clear in higher level than entry level. Therefore, our algorithm has different performances given data with different qualities.

Reduced Markov Decision Process Formulation

As discussed, there are two factors, i.e., the pairwise probability and their seniority, affecting the latent relationship prediction. The global hierarchy construction may be modelled as a random process with rewards. The local pairwise latent relationship prediction result may provide a graph where each node represents a person and each edge connects a person and his or her manager candidate with a weight (prediction probability). The objective is to derive a generated tree from the graph which is most likely to be the real hierarchy, in this case the organization chart with the CEO as the root of the tree. Given this setting, the hierarchy construction process can be treated as a random walk on the graph. Each node could be a state in the random process, and each directed weighted edge represents the transit probability between two states. The seniority differences between two nodes can represent the reward for moving between the two "states". Therefore, the construction phase may be converted to a random process with rewards. A Markov Decision Process (MDP) may be used as a good model for capturing the problem. The general idea of MDP is a Markov chain with actions and rewards. It is a simulation of a decision making process with random probabilities and the decision maker's actions. The MDP may be formulated for the above case as follows.

A Markov Decision Process with respect to a latent hierarchy relationship inference is a 4-tuple (S, A, P, R), where S=N is the node set of the graph.

A is a finite set of actions (discussed subsequently)

P={p(x≺y)|x∈N, y∈ψ$_x$} is the set of pairwise probabilities, which are also transitional probabilities between different states (nodes) in the MDP.

R={r(x, y)|x∈N, y∈ψ$_x$} is the set of reward functions, the reward of moving from state x to y being based on seniorities of x and y (discussed subsequently).

The reward R for assigning x's manager to be y is related to the difference of their seniorities. Ideally, one's manager's seniority is the smallest value that is larger than one's own seniority. However, in reality, the case is really different because of the data quality issue that discussed previously. When one's seniority is mis-generated, there may be the case where a manager's seniority is the same, or even lower than the employee's seniority value. To tolerate such a scenario and also capture the real value of seniority in the model, a reward function for assigning y to be x's manager may be defined as follows.

$$r(x,y)=e^{-\lambda((\omega_y-\omega_x)-1)^2}$$

where

λ is a constant factor, $\omega_x$ is the seniority value of x from Table I, and $\omega_y$ is the seniority value of y from Table I.

Figure 18:
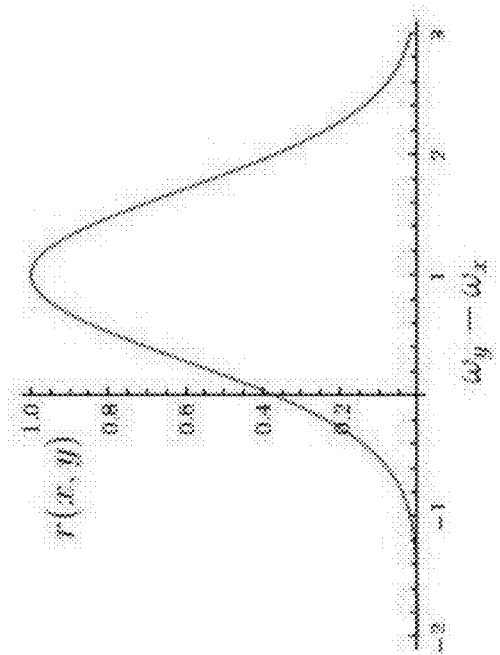
FIG. 18 illustrates the shape of a reward function as used in an embodiment.

The above function, r(x, y) is seen to be maximized when y is 1-level senior than x. The reward value decreases sharply to other situations. FIG. 18 illustrates the shape of the reward function r(x, y).

The objective function of such a MDP is to maximize the rewards, given the transition probability P and action a. More formally, it is:

$$\max \sum_{x \in N, y \in \Psi x} r_a(x, y)$$

The action here is of only one type. There is only one action through which a state transits to another, even though the rewards vary. In an ordinary MDP, there is usually more than one type of action. The rewards of reaching the same state by different actions are different. However, in the case under discussion, there is no need for multiple types of actions. Therefore, the model can be named as Reduced MDP, which is a simplified version with only one type of action.

Shortest Path Solution

To solve a MDP, reinforced learning and dynamic programming are usually suitable tools. However, since a reduced MDP is used, a more efficient way to solve it may be formulated. The algorithm for this may involve two parts: merging the reward and transitional probability, and the computing single source shortest path.

Merge Reward into Transitional Probability.

As there is no explicit difference of actions, the chance of getting a reward r(x, y) is to go along the path with probability p(x≻y). Therefore, the expected gain is simply r(x, y)p(x≻y). The real world meaning of this, in the application under discussion, is that by assigning y to be x's manager, the confidence is p(x≻y) and if the assignment is beneficial for the whole global structure, the reward is r(x, y). There is a trade-off with respect to different combinations of rewards and probabilities. A high reward but low probability state should not be chosen if the expected value is low. Therefore, our objective is to generate a tree structure that maximizes the expected reward.

Single Source Shortest Path.

Every time a pairwise latent relationship is discovered, it contributes a little bit to the global hierarchy. In the organization chart mining problem, the final organization chart is built by all pairwise manager-employee relationships. As discussed above, the organization chart structure is more efficient if it contains only the shortest paths from every employee to the CEO. Following this heuristic, combined with the merged reward and transitional probability approach, the reduced MDP problem may be solved using a single source shortest path (SSSP) algorithm. In our case, the CEO node is the "source" in a company graph. With the expected gain as the weight of an edge, we can use SSSP to generate the shortest path tree which is the globally optimized hierarchy structure.

An algorithm may be as follows.

---

Algorithm 1 SSSP algorithm

---

Input: Target Graph G(N, E); Pairwise latent relation probability P;
Reward function R
Output: Global hierarchy T ⊂ G
// Initialization step
Compute the expected reward for every edge in G
// Start to compute SSSP from source node to all others
Set i = 1
while T is not converged do
  // Compute $T_{i-1}$
  Put the source in a queue Q and mark all other nodes to be unvisited
  while Q is not empty do
    Take out the head element h in Q and get all its neighbors in Q
    for v in h's neighbors do
      if reward(v)>reward(u)+reward(u,h) then
        update reward(v, h)
      end if
    end for
  end while
  //peer correction
  adjust u's assignment according to the assignments of $\Psi_u$
  i++
end while

---

Figure 19:
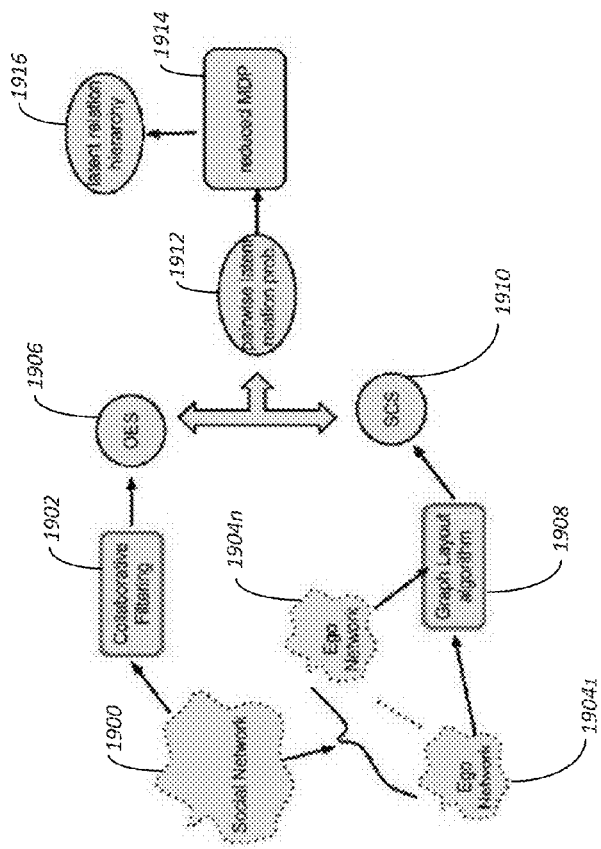
FIG. 19 illustrates a system for implementing an embodiment.

Our framework involves several expensive computation tasks, such as large scale collaborative filtering and node distance calculation on large graph. The big data generated by real world social network application also make the computation more challenging. Therefore, to provide efficiency of computation, a combination of a platform and a single machine paradigm may be used. A system for implementing an embodiment is illustrated in FIG. 19. The social network service is seen at 1900, and includes member profiles. Collaborative filtering 1902 is used to generate a score of "objective entangled strength" 1906 to measure how pairs of users entangle from objective perspective. Ego networks of members 1 through N, at 1904$_1$ through 1904$_N$ which are then used as input to the force based graph layout algorithm 1910 which produces two-dimensional coordinates for nodes and may be used to compute Subjective Coherence Strength 1910 as node distances using a Euclidean scheme. In one embodiment the graph layout algorithm is the Yihan Hu algorithm discussed above. The modules 1902 and 1908 may be implemented on a Hadoop platform with N nodes, which may be operated offline. The other modules are implemented in a single server with M CPU and MGB physical memory. Pairwise latent relationship probability is calculated at 1912 and used as input to the reduced MDP process 1914 described above to calculate the latent relation hierarchy 1916, or organization chart.

Figure 20A:
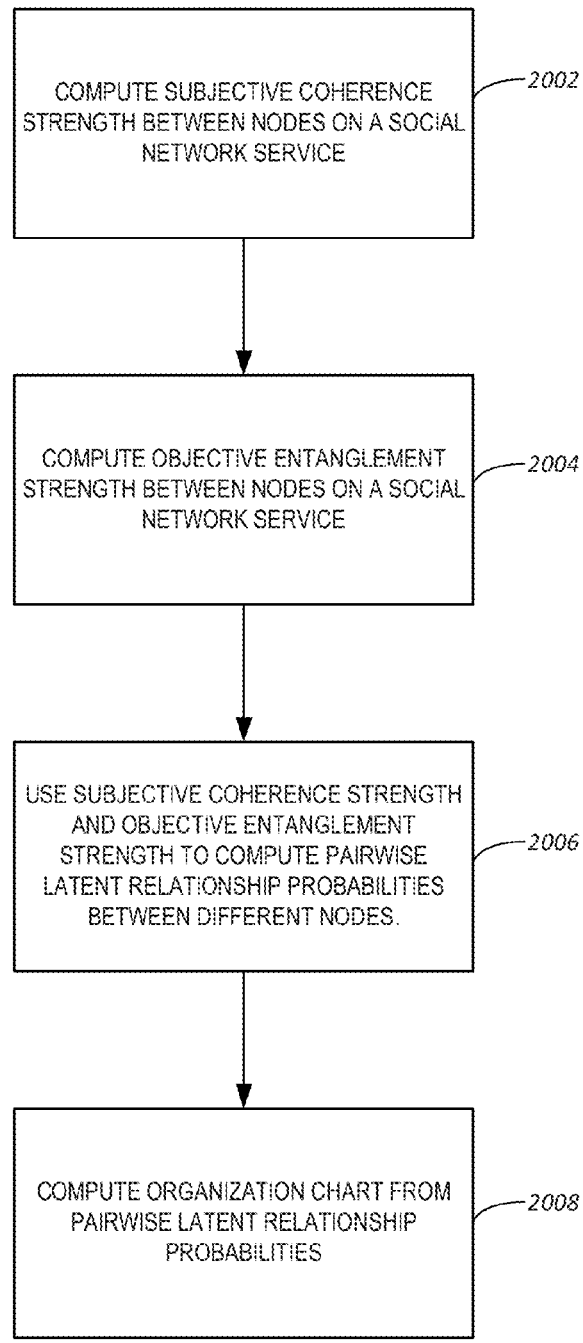
FIG. 20A is a flowchart useful in an embodiment.
Figure 20B:
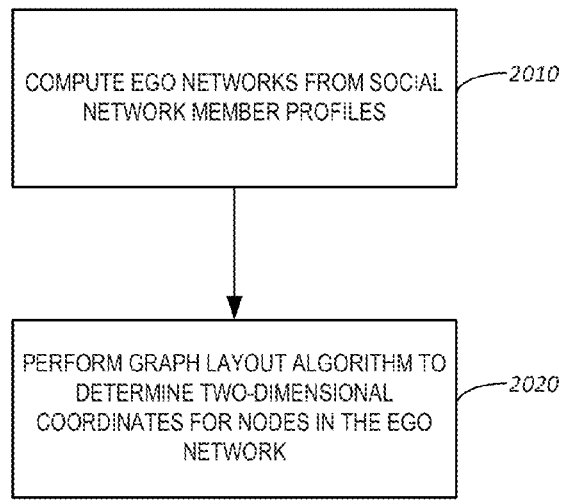
FIG. 20B is a flowchart useful in FIG. 20B.
Figure 20C:
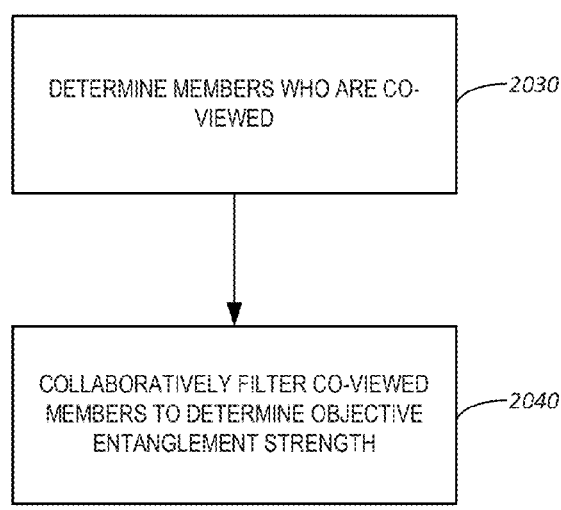
FIG. 20C is a flowchart useful in FIG. 20C.
Figure 21:
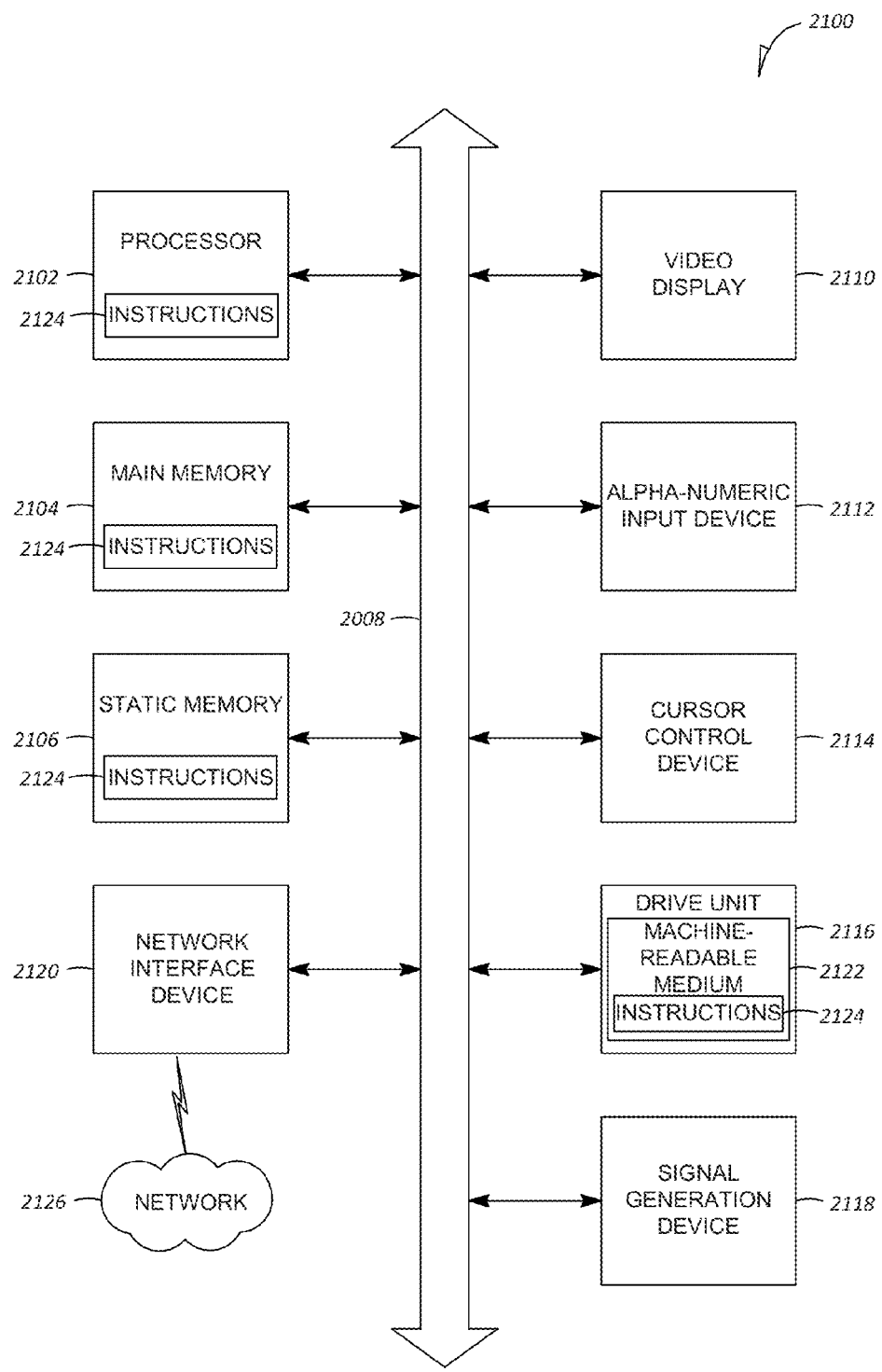
FIG. 21 is a block diagram of a machine in the form of a computing device within which a set of instructions, for causing the machine to perform any one or more of the methodologies discussed herein, may be executed.

FIG. 20A is a flowchart illustrating operation of an embodiment. At 2002 the subjective coherence strength between nodes is computed as at 1910 of FIG. 19. At 2004 the objective entanglement strength between nodes is computed as at 1906 of FIG. 19. At 2006 the subjective coherence strength and the objective entanglement strength is used to compute pairwise latent relationships between different nodes as at 1912. The result is used at 2008 to compute the global hierarchy of an organization which in an embodiment is the organization chart of part of a company as at 1914 and 1916 of FIG. 19. FIG. 20B is a flowchart illustrating the operation of part of the computation of subjective coherence strength in 2008 of FIG. 20A. At 2010 the ego networks of member profiles are computed as at $1904_1 \ldots 1904_N$ of FIG. 19. At 2020 a graph layout algorithm is performed as at 1908 of FIG. 19, and the result is used as inputs to the selective coherence strength calculation as at 1910 of FIG. 19. FIG. 20C is a flowchart illustrating the operation of part of the computation of objective entanglement strength. Co-viewed members are determined at 2030 by collaborative filtering at 2040 as at 1902 of FIG. 19. The result is used in the computation process for objective entanglement strength as at 1906 of FIG. 19.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

FIG. 2 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2100 includes a processor 2102 (e.g., a central processing unit (CPU), a graphics processing unit (GPU) or both), a main memory 2101 and a static memory 2106, which communicate with each other via a bus 2108. The computer system 2100 may further include a display unit 2110, an alphanumeric input device 2117 (e.g., a keyboard), and a user interface (UI) navigation device 2111 (e.g., a mouse). In one embodiment, the display, input device and cursor control device are a touch screen display. The computer system 2100 may additionally include a storage device 2116 (e.g., drive unit), a signal generation device 2118 (e.g., a speaker), a network interface device 2120, and one or more sensors 2121, such as a global positioning system sensor, compass, accelerometer, or other sensor.

The drive unit 2116 includes a machine-readable medium 2122 on which is stored one or more sets of instructions and data structures (e.g., software 2123) embodying or utilized by any one or more of the methodologies or functions described herein. The software 2123 may also reside, completely or at least partially, within the main memory 2101 and/or within the processor 2102 during execution thereof by the computer system 2100, the main memory 2101 and the processor 2102 also constituting machine-readable media.

While the machine-readable medium 2122 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 2123 may further be transmitted or received over a communications network 2126 using a transmission medium via the network interface device 2120 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
computing distance between nodes of first members of a social network service based on information supplied by the first members, the nodes positioned in a social graph that is implemented with a graph data structure that includes nodes, edges, and properties to represent and store data stored in a database of a networked system, the distance representing subjective coherence strength, the subjective coherence strength comprising a quantified subjective closeness between members;
generating a score based on users of the social network viewing together nodes of second members of the social network, the score representing objective entanglement strength between the nodes of the second members based on the commonality of the second members recognized by the users, the objective entanglement strength comprising quantified objective similarity;
using the subjective coherence strength and the objective entanglement strength to compute pairwise latent relationship probabilities between pairs of different nodes of the social network service, the pairwise latent probabilities comprising a measurement of the probabilities of latent hierarchy relationship; and
using the pairwise latent relationship probabilities to create a global hierarchy relationship comprising an organization chart for at least two levels of an organization that includes as members at least some of the first members and at least some of the second members, one or more modules incorporated into the networked system to configure one or more processors of the networked system to perform the computing, the generating, the using of the subjective coherence strength and the objective entanglement strength, and the using the of pairwise latent relationship probabilities to create a global hierarchy relationship.

2. The method of claim 1, the computing objective entanglement strength comprising determining co-viewed members of the social network service and using information from the nodes of the co-viewed members for computing objective entanglement strength.

3. The method of claim 2, the determining co-viewed members comprising collaboratively filtering information from the nodes of the social network.

4. The method of claim 3 comprising selecting a latent relationship candidate set by computing pairwise job title similarity.

5. The method of claim 1, the computing subjective coherence strength comprising computing ego networks from nodes of members of the social network service and performing a graph layout algorithm for the ego networks.

6. The method of claim 5 wherein the ego network of a node u is $$\Omega_u = \{Nu, E_{Nu}\}$$

where Nu is the set of adjacent nodes of u, and
$ENu = \{eij|i, j \in Nu\}$ is the edges among u's neighbors.

7. The method of claim 1, wherein using the pairwise latent relationship probabilities to compute the global hierarchy relationship comprises using a reduced Markov Decision Process, the reduced Markov Decision Process comprising a reward function based on the seniorities of two related members of the social network service.

8. A machine-readable hardware storage device having embedded therein a set of instructions which, when executed by one or more processors cause the one or more processors to perform operations, the operations comprising:
computing distance between nodes of first members of a social network service based on information supplied by the first members, the nodes positioned in a social graph that is implemented with a graph data structure that includes nodes, edges, and properties to represent and store data stored in a database of a networked system, the distance representing subjective coherence strength, the subjective coherence strength comprising a quantified subjective closeness between members;
generating a score based on users of the social network viewing together nodes of second members of the social network, the score representing objective entanglement strength between the nodes of the second members based on the commonality of the second members recognized by the users, the objective entanglement strength comprising quantified objective similarity;
using the subjective coherence strength and the objective entanglement strength to compute pairwise latent relationship probabilities between pairs of different nodes of the social network service, the pairwise latent probabilities comprising the probabilities of latent hierarchy relationship; and
using the pairwise latent relationship probabilities to create a global hierarchy relationship comprising an organization chart for at least two levels of an organization that includes as members at least some of the first members and at least some of the second members.

9. The machine-readable hardware storage device of claim 8, the computing objective entanglement strength comprising determining co-viewed members of the social network service and using information from the nodes of the co-viewed members for computing objective entanglement strength.

10. The machine-readable hardware storage device of claim 9, the determining co-viewed members comprising collaboratively filtering information from the nodes of the social network.

11. The machine-readable hardware storage device of claim 10, the operations further comprising selecting a latent relationship candidate set by computing pairwise job title similarity.

12. The machine-readable hardware storage device of claim 8, the computing subjective coherence strength comprising computing ego networks from nodes of members of the social network service and performing a graph layout algorithm for the ego networks.

13. The machine-readable hardware storage device of claim 12 wherein
the ego network of a node u is $\Omega_u = \{N_u, E_{Nu}\}$ where Nu is the set of adjacent nodes of u and $E_{Nu} = \{e_{ij} | i, j \in Nu\}$ is the edges among u's neighbors.

14. The machine-readable hardware storage device of claim 8, the using the pairwise relationship probabilities to compute the global hierarchy relationship comprising using a reduced Markov Decision Process that comprises a reward function based on the seniorities of two related members of the social network service.

15. A system comprising:
one or more hardware computer processors configured to, based on an execution of one or more instructions included in a computer memory;
compute distance between nodes of first members of a social network service based on information supplied by the first members, the nodes positioned in a social graph that is implemented with a graph data structure that includes nodes, edges, and properties to represent and store data stored in a database of a networked system, the distance representing subjective coherence strength, the subjective coherence strength comprising a quantified subjective closeness between members;
generate a score based on users of the social network viewing together nodes of second members of the social network, the score representing objective entanglement, wherein the objective entanglement quantifies objective similarity between the nodes of the second members based on the commonality of the second members recognized by the users, the objective entanglement strength comprising quantified objective similarity;
use the subjective coherence strength and the objective entanglement strength to compute pairwise latent relationship probabilities, wherein the pairwise latent relationship probabilities measure the pairwise latent hierarchy relationship probabilities between pairs of different nodes of the social network service; and
use the pairwise latent relationship probabilities to compute a global hierarchy relationship that comprises an organization chart for at least two levels of an organization that includes as members at least some of the first members and at least some of the second members, one or more modules incorporated into the networked system to configure one or more processors of the networked system to perform the computing, the generating, the using of the subjective coherence strength and the objective entanglement strength, and the using the of pairwise latent relationship probabilities to create a global hierarchy relationship.

16. The system of claim 15, the at least one computer processor further configured to compute objective entanglement strength by a determination of co-viewed members of the social network service, and use of information from the nodes of the co-viewed members to compute objective entanglement strength.

17. The system of claim 16, the at least one computer processor further configured to determine co-viewed members by collaborative filtration of information from the nodes of the social network.

18. The system of claim 17 the at least one computer processor further configured to select a latent relation candidate set by computation of pairwise job title similarity.

19. The system of claim 15, the at least one computer processor further configured to compute subjective coherence strength by computation of ego networks from nodes of members of the social network service and performance of a graph layout algorithm for the ego networks.

20. The system of claim 15, the at least one computer processor further configured to use the pairwise latent relationship probabilities to compute the global hierarchy relationship by use of a reduced Markov Decision Process that comprises a reward function based on the seniorities of two related members of the social network service.

* * * * *

UNITED STATES PATENT AND TRADEMARK OFFICE
CERTIFICATE OF CORRECTION

PATENT NO. : 9,886,522 B2
APPLICATION NO. : 14/716502
DATED : February 6, 2018
INVENTOR(S) : Zhang et al.

Page 1 of 1

It is certified that error appears in the above-identified patent and that said Letters Patent is hereby corrected as shown below:

In the Claims

In Column 29, Line 61, in Claim 1, delete "the of" and insert --of the-- therefor In Column 30, Line 15, in Claim 6, delete "$\Omega_u=\{Nu,E_{Nu}\}$" and insert --$\Omega_u=\{N_u,E_{Nu}\}$-- therefor In Column 30, Line 16, in Claim 6, delete "Nu" and insert --$N_u$-- therefor In Column 30, Line 17, in Claim 6, delete "$ENu=\{eij|i,j\epsilon Nu\}$" and insert --$E_{Nu}=\{eij|i,j\epsilon N_u\}$-- therefor In Column 31, Line 14, in Claim 13, delete "Nu" and insert --$N_u$-- therefor In Column 31, Line 15, in Claim 13, delete "Nu}" and insert --$N_u$}-- therefor In Column 32, Line 17, in Claim 15, delete "the of" and insert --of the-- therefor Signed and Sealed this
Eleventh Day of June, 2019

Andrei Iancu
*Director of the United States Patent and Trademark Office*